(12) United States Patent
Maschmeyer et al.

(10) Patent No.: US 10,122,049 B2
(45) Date of Patent: Nov. 6, 2018

(54) GELATED IONIC LIQUID FILM-COATED SURFACES AND USES THEREOF

(71) Applicant: Gelion Technologies Pty Ltd, Sydney (AU)

(72) Inventors: Thomas Maschmeyer, Lindfield (AU); Max Easton, Enmore (AU); Antony Ward, Erskineville (AU)

(73) Assignee: Gelion Technologies Pty Ltd, Sydney (AU)

( * ) Notice: Subject to any disclaimer, the term of this patent is extended or adjusted under 35 U.S.C. 154(b) by 0 days.

(21) Appl. No.: 15/116,802

(22) PCT Filed: Feb. 6, 2015

(86) PCT No.: PCT/AU2015/000062
§ 371 (c)(1),
(2) Date: Aug. 4, 2016

(87) PCT Pub. No.: WO2015/117189
PCT Pub. Date: Aug. 13, 2015

(65) Prior Publication Data
US 2016/0351969 A1 Dec. 1, 2016

(30) Foreign Application Priority Data

Feb. 6, 2014 (AU) ................................ 2014900359
Dec. 24, 2014 (AU) ................................ 2014905263

(51) Int. Cl.
*H01M 10/36* (2010.01)
*H01M 4/38* (2006.01)
(Continued)

(52) U.S. Cl.
CPC ......... *H01M 10/365* (2013.01); *H01M 4/388* (2013.01); *H01M 4/661* (2013.01);
(Continued)

(58) Field of Classification Search
CPC .... H01M 10/365; H01M 8/188; H01M 4/663; H01M 4/661; H01M 10/36; H01M 4/388; H01M 10/0565; H01M 2300/0085
See application file for complete search history.

(56) References Cited

U.S. PATENT DOCUMENTS 5,523,179 A 6/1996 Chu
5,532,077 A 7/1996 Chu
(Continued)

FOREIGN PATENT DOCUMENTS

CN 1941219 A 4/2007
JP 2012-201723 A 10/2012
(Continued)

OTHER PUBLICATIONS

Antionetti et al., "Ionic Liquids for the Convenient Synthesis of Functional Nanoparticles and Other Inorganic Nanostructures," *Angewandte Chemie Int. Ed.* 43:4988-4992, 2004.
(Continued)

*Primary Examiner* — Stewart A Fraser
(74) *Attorney, Agent, or Firm* — Seed IP Law Group LLP

(57) ABSTRACT

The invention relates to an assembly comprising a first gelated ionic liquid film in contact with a first electrically conductive surface, wherein the first gelated ionic liquid film comprises a first ionic liquid encapsulated within a gel matrix; and a second gelated ionic liquid film in contact with a second electrically conductive surface, wherein the second gelated ionic liquid film comprises a second ionic liquid encapsulated within a gel matrix; wherein the first and second gelated ionic liquid films are in contact with each other. There is also described an electrochemical cell comprising an assembly according to the invention, and methods for producing same.

19 Claims, 12 Drawing Sheets

(51) Int. Cl.
*H01M 4/66* (2006.01)
*H01M 8/18* (2006.01)
H01M 8/20 (2006.01)
H01M 4/02 (2006.01)
H01M 10/0565 (2010.01)

(52) U.S. Cl.
CPC ........... *H01M 4/663* (2013.01); *H01M 8/188* (2013.01); *H01M 10/36* (2013.01); H01M 8/20 (2013.01); H01M 10/0565 (2013.01); H01M 2004/023 (2013.01); H01M 2300/0085 (2013.01); Y02E 60/528 (2013.01)

(56) References Cited

U.S. PATENT DOCUMENTS

| | | |
|---|---|---|
| 5,582,623 A | 12/1996 | Chu |
| 5,686,201 A | 11/1997 | Chu |
| 5,789,108 A | 8/1998 | Chu |
| 5,814,420 A | 9/1998 | Chu |
| 6,017,651 A | 1/2000 | Nimon et al. |
| 6,025,094 A | 2/2000 | Visco et al. |
| 6,030,720 A | 2/2000 | Chu et al. |
| 6,086,540 A | 7/2000 | Bonneville et al. |
| 6,165,644 A | 12/2000 | Nimon et al. |
| 6,190,792 B1 | 2/2001 | Faris et al. |
| 6,218,034 B1 | 4/2001 | Faris et al. |
| 6,228,519 B1 | 5/2001 | Faris et al. |
| 6,239,508 B1 | 5/2001 | Faris et al. |
| 6,287,715 B1 | 9/2001 | Faris et al. |
| 6,296,960 B1 | 10/2001 | Faris et al. |
| 6,299,997 B1 | 10/2001 | Faris et al. |
| 6,306,534 B1 | 10/2001 | Faris et al. |
| 6,309,771 B1 | 10/2001 | Faris et al. |
| 6,312,844 B1 | 11/2001 | Faris |
| 6,335,111 B1 | 1/2002 | Faris et al. |
| 6,348,277 B1 | 2/2002 | Faris et al. |
| 6,358,643 B1 | 3/2002 | Katz et al. |
| 6,365,292 B1 | 4/2002 | Faris et al. |
| 6,376,123 B1 | 4/2002 | Chu |
| 6,383,673 B1 | 5/2002 | Faris et al. |
| 6,410,174 B1 | 6/2002 | Faris |
| 6,451,463 B1 | 9/2002 | Tsai et al. |
| 6,485,850 B1 | 11/2002 | Tsai et al. |
| 6,534,655 B1 | 3/2003 | Arnold et al. |
| 6,537,701 B1 | 3/2003 | Nimon et al. |
| 6,558,829 B1 | 5/2003 | Faris et al. |
| 6,562,494 B1 | 5/2003 | Tsai et al. |
| 6,569,555 B1 | 5/2003 | Faris et al. |
| 6,634,558 B1 | 10/2003 | Patel et al. |
| 6,641,943 B1 | 11/2003 | Faris et al. |
| 6,824,927 B1 | 11/2004 | Katsurao et al. |
| 7,476,468 B1 | 1/2009 | Lam et al. |
| 7,588,859 B1 | 9/2009 | Oh et al. |
| 7,598,003 B1 | 10/2009 | Yoon et al. |
| 7,771,496 B1 | 8/2010 | Nakahara et al. |
| 8,076,031 B1 | 12/2011 | West et al. |
| 8,076,032 B1 | 12/2011 | West et al. |
| 8,153,307 B1 | 4/2012 | Tanaka et al. |
| 8,375,768 B2 | 2/2013 | Zeng et al. |
| 8,535,834 B1 | 9/2013 | Yoon |
| 8,815,453 B1 | 8/2014 | Tsukamoto |
| 9,466,837 B1 | 10/2016 | Yoon et al. |
| 2001/0007725 A1 | 7/2001 | Faris et al. |
| 2001/0008721 A1 | 7/2001 | Faris et al. |
| 2001/0014416 A1 | 8/2001 | Faris et al. |
| 2001/0023036 A1 | 9/2001 | Faris et al. |
| 2002/0022168 A1 | 2/2002 | Faris et al. |
| 2002/0168559 A1 | 11/2002 | Faris et al. |
| 2002/0182508 A1 | 12/2002 | Nimon et al. |
| 2003/0054217 A1 | 3/2003 | Faris |
| 2003/0143446 A1 | 7/2003 | Faris et al. |
| 2003/0180624 A1 | 9/2003 | Oh et al. |
| 2003/0180625 A1 | 9/2003 | Oh et al. |
| 2004/0005488 A1 | 1/2004 | Faris et al. |
| 2004/0146764 A1 | 7/2004 | Tsai et al. |
| 2004/0197665 A1 | 10/2004 | Amine et al. |
| 2004/0209168 A1 | 10/2004 | Katsurao et al. |
| 2004/0214090 A1 | 10/2004 | West et al. |
| 2004/0247969 A1 | 12/2004 | Faris et al. |
| 2004/0248014 A1 | 12/2004 | West et al. |
| 2005/0019656 A1 | 1/2005 | Yoon et al. |
| 2005/0019667 A1 | 1/2005 | Oh et al. |
| 2005/0106470 A1 | 5/2005 | Yoon et al. |
| 2005/0170253 A1 | 8/2005 | Yoon et al. |
| 2005/0170254 A1 | 8/2005 | West et al. |
| 2006/0035154 A1 | 2/2006 | West et al. |
| 2007/0065728 A1 | 3/2007 | Zhang et al. |
| 2008/0000771 A1 | 1/2008 | Kakiuchi et al. |
| 2008/0070104 A1 | 3/2008 | Lin et al. |
| 2009/0053610 A1 | 2/2009 | Katsurao et al. |
| 2009/0301297 A1 | 12/2009 | Littau |
| 2010/0178555 A1 | 7/2010 | Best |
| 2011/0003211 A1 | 1/2011 | Hudson et al. |
| 2011/0033755 A1 | 2/2011 | Eitouni et al. |
| 2011/0281173 A1 | 11/2011 | Singh et al. |
| 2011/0281175 A1 | 11/2011 | Hudson et al. |
| 2012/0009482 A1 | 1/2012 | Katsurao et al. |
| 2012/0021279 A1 | 1/2012 | Le Bideau et al. |
| 2012/0077095 A1 | 3/2012 | Roumi et al. |
| 2012/0110835 A1 | 5/2012 | Hudson et al. |
| 2012/0115041 A1 | 5/2012 | West et al. |
| 2012/0135313 A1 | 5/2012 | West et al. |
| 2012/0171578 A1 | 7/2012 | Zhang et al. |
| 2012/0259376 A1 | 10/2012 | Godden |
| 2012/0259391 A1 | 10/2012 | Godden |
| 2012/0270078 A1 | 10/2012 | Godden |
| 2013/0143145 A1 | 6/2013 | Godden |
| 2013/0143147 A1 | 6/2013 | Godden |
| 2013/0149585 A1 | 6/2013 | Wei et al. |
| 2013/0189592 A1 | 7/2013 | Roumi et al. |
| 2013/0217961 A1 | 8/2013 | Godden |
| 2013/0224609 A1 | 8/2013 | Lee et al. |
| 2013/0257378 A1 | 10/2013 | Lu et al. |
| 2013/0257389 A1 | 10/2013 | Lu et al. |
| 2013/0260021 A1 | 10/2013 | Lu et al. |
| 2013/0260222 A1 | 10/2013 | Lu et al. |
| 2013/0260232 A1 | 10/2013 | Lu et al. |
| 2013/0260260 A1 | 10/2013 | Lu et al. |
| 2013/0266860 A1 | 10/2013 | Lu et al. |
| 2013/0266861 A1 | 10/2013 | Lu et al. |
| 2014/0017557 A1 | 1/2014 | Lockett et al. |
| 2014/0038044 A1 | 2/2014 | Vail et al. |
| 2014/0050982 A1 | 2/2014 | Lu et al. |
| 2014/0139975 A1* | 5/2014 | Lowenthal ............ B82Y 25/00 361/502 |
| 2014/0154575 A1 | 6/2014 | Lu et al. |
| 2014/0176077 A1 | 6/2014 | Lu et al. |
| 2014/0178761 A1 | 6/2014 | Lu et al. |
| 2014/0186706 A1 | 7/2014 | Wang et al. |
| 2014/0186707 A1 | 7/2014 | Lu et al. |
| 2014/0186719 A1 | 7/2014 | Wang et al. |
| 2014/0205883 A1 | 7/2014 | Wang et al. |
| 2014/0239907 A1 | 8/2014 | Wang et al. |
| 2014/0239920 A1 | 8/2014 | Lu et al. |
| 2014/0255770 A1 | 9/2014 | Lee et al. |
| 2014/0264160 A1 | 9/2014 | Lu et al. |
| 2014/0335409 A1 | 11/2014 | Wang et al. |
| 2014/0342244 A1 | 11/2014 | West et al. |
| 2014/0370187 A1 | 12/2014 | Vail et al. |
| 2015/0200390 A1 | 7/2015 | Lu et al. |
| 2015/0243987 A1 | 8/2015 | Lu et al. |
| 2015/0243988 A1 | 8/2015 | Lu et al. |
| 2015/0263383 A1 | 9/2015 | Lu et al. |
| 2015/0266745 A1 | 9/2015 | Song et al. |
| 2015/0266746 A1 | 9/2015 | Song et al. |
| 2015/0270547 A1 | 9/2015 | Ji et al. |
| 2015/0287991 A1 | 10/2015 | Lu et al. |
| 2015/0311515 A1 | 10/2015 | Zhao et al. |
| 2015/0349338 A1 | 12/2015 | Zhao et al. |
| 2015/0357630 A1 | 12/2015 | Lu et al. |
| 2015/0357646 A1 | 12/2015 | Lu et al. |
| 2016/0028086 A1 | 1/2016 | Vail et al. |
| 2016/0028114 A1 | 1/2016 | Pratt et al. |

(56) References Cited

U.S. PATENT DOCUMENTS

| | | |
|---|---|---|
| 2016/0056467 A1 | 2/2016 | Song et al. |
| 2016/0086741 A1* | 3/2016 | Lowenthal ............ B82Y 25/00 361/502 |
| 2016/0087260 A1 | 3/2016 | Lu et al. |
| 2016/0118659 A1 | 4/2016 | Lu et al. |
| 2016/0285098 A1 | 9/2016 | Lu et al. |
| 2016/0294012 A1 | 10/2016 | Pratt et al. |
| 2016/0301101 A1 | 10/2016 | Pratt et al. |
| 2016/0336588 A1 | 11/2016 | Lu et al. |
| 2016/0336620 A1 | 11/2016 | Yang et al. |
| 2016/0340200 A1 | 11/2016 | Lu et al. |
| 2016/0344008 A1 | 11/2016 | Eitouni et al. |
| 2016/0365606 A1 | 12/2016 | Sivanandan et al. |
| 2017/0018774 A1 | 1/2017 | Lu et al. |
| 2017/0149053 A1 | 5/2017 | Lu et al. |

FOREIGN PATENT DOCUMENTS

| | | |
|---|---|---|
| JP | 2012-236156 A | 12/2012 |
| JP | 2013-58365 A | 3/2013 |
| JP | 2014-10997 A | 1/2014 |
| WO | 95/18464 A1 | 7/1995 |
| WO | 96/16450 A1 | 5/1996 |
| WO | 98/05085 A1 | 2/1998 |
| WO | 99/17770 A1 | 4/1999 |
| WO | 99/17810 A1 | 4/1999 |
| WO | 99/18030 A2 | 4/1999 |
| WO | 99/18620 A2 | 4/1999 |
| WO | 99/18627 A1 | 4/1999 |
| WO | 99/18628 A1 | 4/1999 |
| WO | 99/19931 A1 | 4/1999 |
| WO | 99/34372 A1 | 7/1999 |
| WO | 01/28028 A1 | 4/2001 |
| WO | 01/57943 A1 | 8/2001 |
| WO | 02/35625 A2 | 5/2002 |
| WO | 02/35627 A2 | 5/2002 |
| WO | 02/41416 A2 | 5/2002 |
| WO | 03/83970 A1 | 10/2003 |
| WO | 03/83971 A1 | 10/2003 |
| WO | 03/83972 A1 | 10/2003 |
| WO | 03/83973 A1 | 10/2003 |
| WO | 03/83974 A1 | 10/2003 |
| WO | 2004/006360 A2 | 1/2004 |
| WO | 2008/036684 A2 | 3/2008 |
| WO | 2009/103029 A2 | 8/2009 |
| WO | 2009/131961 A2 | 10/2009 |
| WO | 2010/054261 A1 | 5/2010 |
| WO | 2010/054270 A1 | 5/2010 |
| WO | 2010/054272 A1 | 5/2010 |
| WO | 2010/092258 A1 | 8/2010 |
| WO | 2012/034042 A2 | 3/2012 |
| WO | 2012/138351 A1 | 10/2012 |
| WO | 2012/138352 A1 | 10/2012 |
| WO | 2012/138361 A1 | 10/2012 |
| WO | 2012/139100 A1 | 10/2012 |
| WO | 2012/139107 A1 | 10/2012 |
| WO | 2012/139109 A1 | 10/2012 |
| WO | 2013/146745 A1 | 10/2013 |
| WO | 2013/157660 A1 | 10/2013 |
| WO | 2014/118854 A1 | 8/2014 |
| WO | 2014/178170 A1 | 11/2014 |
| WO | 2014/178171 A1 | 11/2014 |
| WO | 2014/178194 A1 | 11/2014 |
| WO | 2015/064069 A1 | 5/2015 |
| WO | 2015/118857 A1 | 8/2015 |
| WO | 2015/133139 A1 | 9/2015 |
| WO | 2015/174043 A1 | 11/2015 |
| WO | 2016/002194 A1 | 1/2016 |
| WO | 2016/147607 A1 | 9/2016 |
| WO | 2016/152055 A1 | 9/2016 |
| WO | 2016/161465 A1 | 10/2016 |
| WO | 2016/164505 A1 | 10/2016 |
| WO | 2016/182797 A1 | 11/2016 |
| WO | 2016/200559 A1 | 12/2016 |
| WO | 2017/019163 A1 | 2/2017 |

OTHER PUBLICATIONS

Berginc et al., "Ionic liquid-based electrolyte solidified with $SiO_2$ nanoparticles for dye-sensitized solar cells," *Thin Solid Films* 516:4645-4650, 2008.

Chan et al., "W1X-1 and W1X-2: W1-Quality Accuracy with an Order of Magnitude Reduction in Computational Cost," *Journal of Chemical Theory and Computation* 8:4259-4269, 2012.

Chen et al., "Raman Spectroscopic Investigation of Tetraethylammonium Polybromides," *Inorganic Chemistry* 49(19):8684-8689, 2010.

Delaney et al., "A Practical Approach to the Development of Inkjet Printable Functional Ionogels—Bendable, Foldable, Transparent, and Conductive Electrode Materials," *Macromolecular Rapid Communications* 31:1970-1976, 2010.

Fang et al., "A novel thixotropic and ionic liquid-based gel electrolyte for efficient dye-sensitized solar cells," *Electrochimica Acta* 68:235-239, 2012.

Fang et al., "'Soggy sand' electrolyte based on COOH-functionalized silica nanoparticles for dye-sensitized solar cells," *Electrochemistry Communications* 16:10-13, 2012.

Fukushima et al., "Molecular Ordering of Organic Molten Salts Triggered by Single-Walled Carbon Nanotubes," *Science* 300:2072-2074, 2003.

Grimme et al., "A consistent and accurate ab initio parametrization of density functional dispersion correction (DFT-D) for the 94 elements H-Pu," *Journal of Chemical Physics* 132(154104):1-19, 2010.

Grimme et al., "Effect of the Damping Function in Dispersion Corrected Density Functional Theory," *Journal of Computational Chemistry* 32:1456-1465, 2011.

Hanabusa et al., "Easy Preparation and Useful Character of Organogel Electrolytes Based on Low Molecular Weight Gelator," *Chemistry of Materials* 11:649-655, 1999.

Hanabusa et al., "Specialist Gelator for Ionic Liquids," *Langmuir* 21:10383-10390, 2005.

Hong et al., "Polymer-ionic liquid gels for enhanced gas transport," *Chemical Communications* 7227-7229, 2009.

Hunter et al., "Substituent effects on cation—π interactions: A quantative study," *PNAS* 99(8):4873-4876, 2002.

Kubo et al., "Photocurrent-Determining Processes in Quasi-Solid-State Dye-Sensitized Solar Cells Using Ionic Gel Electrolytes," *Journal of Physical Chemistry B* 107:4374-4381, 2003.

Marenich et al., "Universal Solvation Model Based on Solute Electron Density and on a Continuum Model of the Solvent Defined by the Bulk Dielectric Constant and Atomic Surface Tensions," *Journal of Physical Chemistry B* 113:6378-6396, 2009.

Merrick et al., "An Evaluation of Harmonic Vibrational Frequency Scale Factors," *Journal of Physical Chemistry A* 111:11683-11700, 2007.

Mohmeyer et al., "Quasi-solid-state dye sensitized solar cells with 1,3:2,4-di-O-benzylidene-D-sorbitol derivatives as low molecular weight organic gelators," *Journal of Materials Chemistry* 14:1905-1909, 2004.

Shimano et al., "Preparation of Nanohybrid Solid-State Electrolytes with Liquidlike Mobilities by Solidifying Ionic Liquids with Silica Particles," *Chemistry of Materials* 19:5216-5221, 2007.

Singh et al., "'Bucky gel' of multiwalled carbon nanotubes as electrodes for high performance, flexible electric double layer capacitors," *Nanotechnology* 24:465704, 2013. (10 pages).

Smith et al., "Ionic liquid-assisted gelation of an organic solvent," *Journal of Molecular Liquids* 157:83-87, 2010.

Stathatos et al., "A Quasi-Solid-State Dye-Sensitized Solar Cell Based on a Sol-Gel Nanocomposite Electrolyte Containing Ionic Liquid," *Chemistry of Materials* 15:1825-1829, 2003.

Sun et al., "Ionic liquid gel electrolytes for quasi-solid-state dye-sensitized solar cells," *Electrochimica Acta* 69:51-55, 2012.

(56) References Cited

OTHER PUBLICATIONS

Tan et al., "Gels of ionic liquid [$C_4$mim]$PF_6$ formed by self-assembly of gelators and their electrochemical properties," *Electrochemistry Communications* 11:933-936, 2009.

Trewyn et al., "Morphological Control of Room-Temperature Ionic Liquid Templated Mesoporous Silica Nanoparticles for Controlled Release of Antibacterial Agents," *Nano Letters* 4(11):2139-2143, 2004.

Ueno et al., "Nanocomposite Ion Gels Based on Silica Nanoparticles and an Ionic Liquid: Ionic Transport, Viscoelastic Properties, and Microstructure," *Journal of Physical Chemistry B* 112:9013-9019, 2008.

Ueno et al., "Colloidal Interaction in Ionic Liquids: Effects of Ionic Structures and Surface Chemistry on Rheology of Silica Colloidal Dispersions," *Langmuir* 25:825-831, 2009.

Ueno et al., "A soft glassy colloidal array in ionic liquid, which exhibits homogeneous, non-brilliant and angle-independent structural colours," *Chemical Communications* 3603-3605, 2009.

Ueno et al., "Soft Glassy Colloidal Arrays in an Ionic Liquid: Colloidal Glass Transition, Ionic Transport, and Structural Color in Relation to Microstructure," *Journal of Physical Chemistry B* 114:13095-13103, 2010.

Ueno et al., "Thermosensitive, Soft Glassy and Structural Colored Colloidal Array in Ionic Liquid: Colloidal Glass to Gel Transition," *Langmuir* 26:18031-18038, 2010.

Voss et al., "Physically Gelled Ionic Liquids: Solid Membrane Materials with Liquidlike $CO_2$ Gas Transport," *Chemistry of Materials* 21:3027-3029, 2009.

Voss et al., "Ionic Liquid Gel-Based Containment and Decontamination Coating for Blister Agent-Contacted Substrates," *Chemistry of Materials* 24:1174-1180, 2012.

Wang et al., "Gelation of Ionic Liquid-Based Electrolytes with Silica Nanoparticles for Quasi-Solid-State Dye-Sensitized Solar Cells," *Journal of the American Chemical Society* 125:1166-1167, 2003.

Wang et al., "Templating Behavior of a Long-Chain Ionic Liquid in the Hydrothermal Synthesis of Mesoporous Silica," *Langmuir* 23:1489-1495, 2007.

Wang et al., "Heteroatom-doped graphene materials: syntheses, properties and applications," *Chemical Society Reviews* 43(20):7067-7098, 2014.

Weber et al., "Controlling Hydrolysis Reaction Rates with Binary Ionic Liquid Mixtures by Tuning Hydrogen-Bonding Interactions," *Journal of Physical Chemistry B* 116:1858-1864, 2012.

Yoon et al., "Dye-sensitized solar cells using ion-gel electrolytes for long-term stability," *Journal of Power Sources* 201:395-401, 2012.

Yuen et al., "Novel bis(methylimidazolium)-alkane bolaamphiphiles as templates for supermicroporous and mesoporous silicas," *Microporous and Mesoporous Materials* 148:62-72, 2012.

Zhao et al., "Hybrid Meta Density Functional Theory Methods for Thermochemistry, Thermochemical Kinetics, and Noncovalent Interactions: The MPW1B95 and MPWB1K Models and Comparative Assessments for Hydrogen Bonding and van der Waals Interactions," *Journal of Physical Chemistry A* 108:6908-6918, 2004.

Zhao et al., "Design of Density Functionals by Combining the Method of Constraint Satisfaction with Parametrization for Thermochemistry, Thermochemical Kinetics, and Noncovalent Interactions," *Journal of Chemical Theory and Computation* 2:364-382, 2006.

Zhu et al., "Graphene and Graphene-Based Materials for Energy Storage Applications," *Small* 10(17):3480-3498, 2014.

\* cited by examiner

GELATED IONIC LIQUID FILM-COATED SURFACES AND USES THEREOF

TECHNICAL FIELD

The present invention relates to the field of reversible electrochemical energy storage and conversion. More particularly, the present invention relates to film coated electrically conductive surfaces, for example electrodes, and battery assemblies comprising same.

PRIORITY

The present application claims priority from Australian provisional patent applications AU 2014900359 and AU 2014905263, the entire contents of which are incorporated herein by cross-reference.

BACKGROUND

Electricity supply in Australia is largely based on remote, centralised fossil-fuelled power stations. Several factors are emerging that will change this platform to one of a more distributed, and potentially intermittent, generation. These include a desire from governments and consumers to reduce carbon emissions, increasing costs of conventional fossil-based energy, and a need to improve network quality and reliability in some fringe and constrained regions. This growing move to distributed and intermittent systems requires a concurrent development of energy storage technology if reliability and quality of supply are to be maintained. Indeed, grid connected energy storage is now acknowledged to be a key component of future electricity supply infrastructure. Various technologies are being considered for grid and transport storage applications, including lithium-ion batteries, sodium-sulfur batteries (NGK Japan), flow batteries, compressed air systems, flywheels, supercapacitors and many more. Flow batteries have long been considered to be the most suitable storage technology for utility applications due to their potential long life, deep discharge characteristics and potentially low manufacturing cost. Flow batteries differ from other battery technologies in that the electrolyte is pumped over the electrodes, which remain electrochemically inert, storing charge through a change in oxidation state (e.g. vanadium redox) or through an electrodeposition such as the zinc-bromine battery. Of these, the zinc-bromine battery offers a solution to most of the problems that have challenged flow battery systems and is considered a highly prospective technology.

A zinc-bromine battery consists of two cells separated by a permeable membrane through which a zinc bromide/bromine electrolyte is circulated (see, e.g., FIG. 1). During the charging step, zinc is electroplated onto the carbon anode, and $Br_2$ is evolved at the carbon cathode. A complexing agent in the electrolyte, N-ethyl-N-methylpyrrolidiniumbromide (MEPBr), is used to reduce the reactivity and vapour pressure of the elemental $Br_2$ by complexing the majority of the $Br_2$ to MEPBr, forming a so-called polybromide complex ($MEPBr_n$). This minimises the self-discharge of the battery and significantly improves the safety of the system. This complex is removed from the stacks via the flowing electrolyte and is stored in an external reservoir. On discharge, the complex is returned to the battery stacks by the operation of a valve or a third pump. Zinc is oxidized to zinc ions on the anodes; the $Br_2$ is released from the complex and subsequently reduced to $Br^-$ ions on the cathodes.

While operational and economic for some applications, existing zinc-bromine battery technology currently only operates at 15% of the theoretically achievable (based on $ZnBr_2$ solubility) specific energy due to sub-optimal electrode design, poor fluid dynamics and the inefficient two-phase fluid, gravity-separated complexing of $Br_2$. This limits the battery to non-transport and low specific energy and energy density applications. Many of the disadvantages with current zinc-bromine battery technology relate to problems with efficiently storing and/or transporting $Zn^{2+}$ and $Br_2/Br^-$ in the electrolyte solution. For example, current battery systems are limited in their specific energy output by the complexing capacity of bromine sequestering agents (BSAs) in the electrolyte, and an ion-selective membrane is needed in current battery systems to prevent a direct reaction between the zinc electrode and bromine that would otherwise lead to the battery shorting out.

SUMMARY OF THE INVENTION

The invention described herein comprises a platform for battery design based on electrolytes comprising gelated ionic liquid film systems (GILFS), coated onto stacks of high-surface area, flexible electrodes, for example, carbon electrodes. This platform provides a basis to produce low-cost, high-performance batteries such as, for example, zinc-bromine batteries. The present invention addresses one or more of the following fundamental scientific parameters that characterise batteries:

1. the speed of the chemical reactions that either store or release electrons (charge/discharge speed);
2. the speed with which ions move inside the battery to compensate for electron flow;
3. the selectivity of movement and reactivity of the electroactive species, to minimise self-discharge;
4. chemical stability of electrolyte, electroactive species and electrode surfaces, to minimise degradation in multiple and deep cycling;
5. mechanical stability, to accommodate changes in volume during charge/discharge.

Within this context, the present invention provides an improved approach over existing flow battery systems by replacing limited efficiency electrolyte/bromine sequestering solutions and removing the ion-selective membrane, while maintaining the ability to charge and discharge a battery by preventing the oxidant (e.g., bromine) from reacting with the reductant (e.g., zinc). This newly identified approach utilises films comprising ionic liquids supported on battery electrodes, or more particularly, gelated ionic liquid films (GILFs) ('ionogels'). A non-limiting example of an electrochemical cell according to the present invention is shown in FIG. 2.

The battery system of the present invention may involve one or more of the following innovations over existing systems:

1. Active to passive—A key disadvantage in the design of current zinc-bromine batteries is evident in that being able to use the cheap redox couple is only possible by accepting the significant drawback of managing bromine in an aqueous medium; this makes the system complicated, bulky, and slow. In accordance with the present invention, using a polybromide-forming gelated liquid salt to manage the bromine without the need to pump solutions can allow the increase of bromide concentration, and reduce both complexity (no moving parts) and bulk. The change from active flow in aqueous media to a non-agitated, non-aqueous ionogel can also reduce costs while maintaining the favourable electrochemistry of zinc bromide. Adventitious moisture may not unduly interfere with battery assembly or operation, further lowering cost and increasing robustness;

2. Eliminating internal stress failure modes—One of the main reasons for failure in conventional batteries is the internal stresses that arise from charging and discharging: namely volume changes and temperature fluctuations. The use of flexible electrodes, e.g., carbon electrodes, in combination with ionogels as disclosed herein can result in batteries that are forgiving of these stresses. Such stress resistance may be enabled through the inherent ability of viscoelastic gels to expand and contract in volume, while not reducing diffusion much below that present in the ionic liquid itself;

3. Positioning the redox species—Reactive ionogel electrolytes uniquely direct the flow of electroactive species, for example, capturing bromine on charge and complexing $Zn^{2+}$ on discharge. This active role of the electrolyte is a major benefit, since the thin gel, customised for each electrode, may keep these species close to their respective electrode surface, improving kinetics and achieving favourable charge/discharge speeds. Experimental results presented herein are consistent with this notion; see Examples section);

4. Eliminating the membrane—Ionogels with superior binding ability can potentially avoid the need for a membrane to keep, for example, $Br_2$ away from a zinc electrode because it will be captured inside its own ionogel layer. This innovation may also lead to improved kinetics;

5. 3D-printed ionogels—Ionogels can be printable on surface-activated electrodes with a thickness of at least 50 microns, improving on the 1 micron thicknesses achievable with ink-jet printing. Importantly, the present invention contemplates the printing of layers of gels with different characteristics, leading to a gradation of functionality within the overall set of films, further improving battery tunability. This may enable the capacity to shape batteries in 3D, allowing their incorporation into space- and design-constrained locations in vehicles and buildings.

Gelated ionic liquid films (GILFs) according to the present invention may be synthesised by mixing selected ionic liquids with gelating agents (e.g., 12-hydroxystearic acid). The gelating agent can then self-assemble into a 3D scaffold, encapsulating the ionic liquid (IL) ions. Thin layers of such gels may be applied to surfaces in the form of a film; thus, although the film comprises a solid-like gel, it retains the fluid characteristics of a liquid due to the mobility of IL ions within the scaffold. A film formed in such a way can be described as a 'liquid film', or a 'gelated ionic liquid film' (GILF).

By varying the choice of IL cations and anions in the gel, GILFs may be made that naturally do not mix (i.e., immiscible gelated IL films). It is also possible to design ILs, and by extension gels comprising the ILs, which are able to immobilise halides such as bromine, and/or which are very inefficient at accepting cations, e.g., $Zn^{2+}$. In isolation, or in combination, such films may be supported on or applied to an electrode surface, where it would be possible, for example, to confine $Zn^{2+}$ ions to one film and $Br_2$ to another film.

Batteries according to the present invention may comprise one or more electrochemical cells, the cells comprising at least an anode, a cathode, and one or more electrolytes. During battery discharge, the anode, which often comprises elemental metal, is oxidised to produce metal cations. The reduction reaction at the cathode depends on the species being reduced.

For example, the oxidation reaction at the anode during battery discharge may be represented by the forward direction of Equation 1:

$$M_{(s)} \rightleftharpoons M^{n+} + ne^-$$ Equation 1

The reduction reaction at the cathode during battery discharge may be represented by the forward direction of Equation 2:

$$R + ne^- \rightleftharpoons R^{n-}$$ Equation 2

As outlined above, gels encapsulating certain ionic liquids may be applied to surfaces, for example, electrode surfaces. When applied to the surface of an anode or cathode, the gel can form a solid-like coating on the electrode, but retain the fluid characteristics of a liquid due to the mobility of IL ions within it.

One advantage of applying films comprising gels encapsulating certain ionic liquids directly onto the electrode surface is that the IL can be specifically selected to have certain sequestering properties depending on which electrode it is to be applied (e.g., the anode or cathode), and also depending on the nature of the oxidising or reducing chemical species at that electrode. For example, the IL in the film coating the cathode may be chosen such that it is able to immobilise the oxidant, R, near the surface of the cathode by using, for example, an R-sequestering IL in the film. Further, the IL in the film coating the cathode may be particularly inefficient at storing $M^{n+}$ cations produced at the anode. Meanwhile, the IL in the film coating the anode may be particularly inefficient at storing the oxidant, R, and instead sequester $M^{n+}$ cations produced at the anode. In this way, the cathode and anode films can be specifically tailored to the chemical reactions occurring at the respective electrode surfaces.

Another advantage of applying films comprising gels encapsulating certain ILs directly onto the electrode surfaces is that the IL film on the cathode(s) can be engineered to be immiscible with the IL film on the anode(s). One benefit of mutually immiscible films is that the film coated anode(s) and cathode(s) can be alternately stacked to form a battery of adjustable voltage. However, once the cathode and anode gel films are in partial or complete contact with each other, their mutual immiscibility will prevent them intermixing. Thus, any sequestered redox reaction products can be effectively confined within one gel film, even though the films are in contact. Further, because the gels comprise IL ions (and optionally added electrolyte species) with a liquid-like mobility, a second benefit is that the films also effectively act as an electrolyte, allowing ion migration between the electrodes and hence maintenance of charge neutrality. This removes the need for large volumes of liquid electrolyte and any associated transport and storage problems.

Conceivably, any suitable combination of redox-active species and corresponding IL films could be used to construct such a battery. For example, the anode could comprise any redox-active metal, e.g., Li, Mg, Zn, Cu, Fe, Co, Mn, Cr, etc. and the oxidant could be any suitable oxidant, for example, a halogen (e.g., Cl, Br, I), oxygen, permanganate, dichromate, perchlorate, etc. One suitable battery system for which the IL films could be used is a zinc-bromine battery, particularly in view of the corrosive and dense nature of $Br_2$ formed during battery charging and the aforementioned disadvantages associated with storage and transport of bromine in the electrolyte. An example of the redox process and associated IL films for a zinc-bromine battery is provided below.

The reduction reaction at the cathode during zinc-bromine battery discharge is represented by the forward direction in Equation 3:

$$Br_2 + 2e^- \rightleftharpoons 2Br^-$$  Equation 3

Therefore, a liquid film coating the cathode should be able to immobilise $Br_2$ near the surface of the cathode (by using, e.g., a bromine-sequestering IL in the film), and the liquid film can allow $Br^-$ ion mobility. Simultaneously, the liquid film coating the cathode can be immiscible with the film coating the anode, and as an added optional precaution, be inefficient at storing cations, e.g., $Zn^{2+}$.

The oxidation reaction at the anode during zinc-bromine battery discharge is represented by the forward direction in Equation 4:

$$Zn_{(s)} \rightleftharpoons Zn^{2+} + 2e^-$$  Equation 4

Therefore, the film coating the anode may allow $Zn^{2+}$ ion mobility and be immiscible with the film coating the cathode, and as an added precaution, be inefficient at immobilising halides, e.g., $Br_2$.

As outlined above, liquid-film-coated electrodes of the present invention could be used in a zinc-bromine battery without the need for a liquid electrolyte or an ion-selective membrane. During charging and discharging, $Br^-$ ions can travel from one film into the other for electrolyte and charge balance, while the $Br_2$ remains separate from the Zn metal in the cathode film. Other proxy ions (as discussed above) could also perform the charge balancing role. The $Zn^{2+}$ can also be engineered to remain in its own film to help speed up charging. In this way, liquid-film coated electrodes can be used to run the reversible electroplating of zinc and concurrent generation of bromine from bromide (charging the battery) when applying external power and the same system can be used to release stored power oxidising zinc metal to $Zn^{2+}$ and by reducing bromine to bromide.

The IL films of the present invention act as filters for electron transfer to and from the electrode underneath. Therefore, whenever an event can be linked to a change in charge (distribution or net) within the film, a potential will change or a current will flow that can be detected. In the case of ion-selective events, it means that the invention will enable a variety of sensor applications.

According to a first aspect of the present invention there is provided an assembly comprising a first gelated ionic liquid film in contact with a first electrically conductive surface, wherein the first gelated ionic liquid film comprises an ionic liquid encapsulated within a gel matrix.

The assembly according to the first aspect above may comprise a second gelated ionic liquid film in contact with a second electrically conductive surface, wherein the second gelated ionic liquid film comprises an ionic liquid encapsulated within a gel matrix; and wherein the first and second liquid films are in contact with each other.

According to a second aspect of the present invention there is provided an assembly comprising: a first gelated ionic liquid film in contact with a first electrically conductive surface, wherein the first gelated ionic liquid film comprises a first ionic liquid encapsulated within a gel matrix; and a second gelated ionic liquid film in contact with a second electrically conductive surface, wherein the second gelated ionic liquid film comprises a second ionic liquid encapsulated within a gel matrix; wherein the first and second gelated ionic liquid films are in contact with each other.

The following options may be used in conjunction with the first or second aspects either alone or in any suitable combination.

The ionic liquid, e.g., the first and/or second ionic liquid, may comprise one or more anions selected from the group consisting of a halogen, a sulfonylimide, a carboxylate, and a fluorinated phosphate anion. The ionic liquid, e.g., the first and/or second ionic liquid, may comprise one or more cations selected from the group consisting of an alkylpyridinium, a dialkylimidazolium, a dialkylpyrrolidinium, a tetraalkylphosphonium, and a tetraalkylammonium cation. The first and/or second gelated ionic liquid film may further comprise an electrolyte salt. The electrolyte salt may be soluble in the ionic liquid. When in contact with each other, the first and second gelated ionic liquid films may be immiscible.

The first electrically conductive surface may be an electrode. The second electrically conductive surface may be an electrode. Each electrode may independently comprise any one or more of graphite (carbon), carbon nanotubes (doped or non-doped), graphene (doped or non-doped), a graphene composite, carbon paper, platinum, gold, or titanium. For example, the first electrically conductive surface may be an anode, and the second electrically conductive surface may be a cathode. The anode and/or the cathode may comprise any one or more of graphite (carbon), carbon nanotubes (doped or non-doped), graphene (doped or non-doped), a graphene composite, carbon paper, platinum, gold, or titanium. The first gelated ionic liquid film may have a thickness of between about 50 μm and about 10 mm. The second gelated ionic liquid film may have a thickness of between about 50 μm and about 10 mm.

The encapsulated ionic liquid, e.g., the encapsulated first and/or second ionic liquid, may comprise one or more anions selected the group consisting of bromide, chloride, iodide, bis(trifluoromethyl-sulfonyl)imide ($NTf_2$), bis(fluorosulfonyl)imide, acetate, propionate, pentanoate, hexanoate, hexafluorophosphate, and tris(pentafluoro)trifluorophosphate. The encapsulated ionic liquid, e.g., the encapsulated first and/or second ionic liquid, may comprise one or more cations selected from the group consisting of 1-butylpyridinium, 1-octylpyridinium, 1-(2-hydroxyethyl)pyridinium, 1-ethyl-3-methylimidazolium, 1-butyl-3-methylimidazolium, 1-pentyl-3-methylimidazolium, 1-hexyl-3-methylimidazolium, 1-methyl-3-octylimidazolium, 1-(2-methoxyethyl)-3-methylimidazolium, 1-(1-methoxymethyl)-3-methylimidazolium, 1-methyl-1-ethylpyrrolidinium, 1-methyl-1-butylpyrrolidinium, 1-methyl-1-hexylpyrrolidinium, 1-(2-methoxyethyl)-1-methylpyrrolidinium, 1-(1-methoxymethyl)-1-methylpyrrolidinium, tetrabutylphosphonium, tributyloctylphosphonium, tributyl(2-methoxyethyl)phosphonium, tributyl-tert-butylphosphonium, tributyl(1-methoxymethyl)phosphonium, tetraethylammonium, tetrabutylammonium, tributyloctylammonium, tributyl(2-methoxyethyl)ammonium, tributyl(1-methoxymethyl)ammonium, and tributyl-tert-butylammonium.

The first and/or second gel matrix may be formed from a gelating agent selected from any one or more of a hydroxy-substituted organic compound, a polysaccharide, a dipeptide, a protein, a polymer, carbon nanotubes, non-doped or doped graphene, functionalised silica nanospheres, and a silica sol-gel. Where the gelating agent is a polymer, the polymer may be poly(vinylidene fluoride-co-hexafluoropropylene). The first and/or second gelated ionic liquid film may further comprise an additional dissolved redox species. The additional dissolved redox species may be selected from the group consisting of: an acetate, nitrate, sulfate, or triflate salt of $Li^+$, $Mg^{2+}$, $Zn^{2+}$, $Cu^{+/2+}$, $Fe^{2+/3+}$, $Co^{2+/3+}$, $Mn^{2+}$, or $Cr^{3+}$; a halogen (e.g., $Cl_2$, $Br_2$, $I_2$); an oxygen, permaanganate, dichromate, perchlorate, or halide salt of $Li^+$, $K^+$, $Ca^{2+}$, $Na^+$, or $Mg^{2+}$; and a mixture of any two or more of these. The first and/or second gelated ionic liquid film may comprise two or more different ionic liquids. The first and/or second ionic liquid may comprise two or more cations and two or more anions that together form a eutectic mixture.

The first and/or second gelated ionic liquid film may be formed by printing the ionic liquid and the gelating agent onto the electrically conductive surface. This may allow for layers of different and to some extent 'gradated' gel compositions to be superimposed that allow for fine-tuning within one gel domain, which in turn may provide control over the diffusion of electro-active species. As well as eliminating the need for an explicit membrane and improving charge and discharge speeds, the tolerance of the system to temperature variation can be engineered more readily, since cross-membrane diffusion is eliminated as a limiting parameter.

According to a third aspect of the present invention there is provided an electrochemical cell comprising the assembly of the first or second aspect above.

According to a fourth aspect of the present invention there is provided the assembly of the first or second aspect above which is an electrochemical cell.

According to a fifth aspect of the present invention there is provided an electrochemical cell comprising a first gelated ionic liquid film in contact with a first electrically conductive surface, wherein the first gelated ionic liquid film comprises a first ionic liquid encapsulated within a gel matrix; and a second gelated ionic liquid film in contact with a second electrically conductive surface, wherein the second gelated ionic liquid film comprises a second ionic liquid encapsulated within a gel matrix; and wherein the first and second liquid films are at least partially in contact.

The following options may be used in conjunction with the third, fourth or fifth aspect either alone or in any suitable combination.

The first and second gelated ionic liquid films at least partially in contact may be immiscible with each other. The first electrically conductive surface may be an anode and the second electrically conductive surface may be a cathode. The first and/or second ionic liquid may comprise one or more anions selected from the group consisting of a halogen, a sulfonylimide, a carboxylate, and a fluorinated phosphate anion. The first and/or second ionic liquid may comprise one or more cations selected from the group consisting of an alkylpyridinium, a dialkylimidazolium, a dialkylpyrrolidinium, a tetraalkylphosphonium, and a tetraalkylammonium cation. The first and/or second ionic liquid may comprise two or more cations and two or more anions that together form a eutectic mixture. The first and/or second gelated ionic liquid film may further comprise an electrolyte salt. The first and/or second gelated ionic liquid film may have a thickness of between about 50 μm and about 10 mm.

The assembly or electrochemical cell may further comprise a third gelated ionic liquid film in contact with a third electrically conductive surface, wherein the third gelated ionic liquid film comprises a third ionic liquid encapsulated within a gel matrix; and wherein the second and third gelated ionic liquid films are at least partially in contact. The second and third gelated ionic liquid films at least partially in contact may be immiscible with each other.

The first and third electrically conductive surfaces may be anodes and the second electrically conductive surface may be a cathode. The anodes and/or the cathode may comprise any one or more of graphite (carbon), carbon nanotubes (doped or non-doped), graphene (doped or non-doped), a graphene composite, carbon paper, platinum, gold, or titanium.

The first gelated ionic liquid film may be formed by printing the ionic liquid and a gelating agent onto the first electrically conductive surface.

According to a sixth aspect of the present invention there is provided a method of producing an assembly according to the first aspect above comprising combining a gelating agent with an ionic liquid at a suitable temperature to produce a mixture, and allowing the gelating agent to set and thereby form a first gelated ionic liquid film in which the ionic liquid is encapsulated; and contacting the mixture or the first gelated ionic liquid film with a first electrically conductive surface.

The method according to the sixth aspect above may further comprise providing a second gelated ionic liquid film comprising a second encapsulated ionic liquid and in contact with a second electrically conductive surface; and contacting the first and second gelated ionic liquid films. The first electrically conductive surface may be an anode and the second electrically conductive surface may be a cathode.

According to a seventh aspect of the present invention there is provided a method of producing an assembly according to the second or fourth aspect above or an electrochemical cell according to the third or fifth aspect above comprising:
  providing a first gelated ionic liquid film comprising a first encapsulated ionic liquid in contact with a first electrically conductive surface; and
  providing a second gelated ionic liquid film comprising a second encapsulated ionic liquid in contact with a second electrically conductive surface; and contacting the first and second gelated ionic liquid films.

The following options may be used in conjunction with the sixth or seventh aspect above either alone or in any suitable combination.

The step of providing may comprise combining a gelating agent with an ionic liquid at a suitable temperature to produce a mixture, and allowing the gelating agent to set and thereby form a gelated ionic liquid film in which the ionic liquid is encapsulated; and contacting the mixture or the gelated ionic liquid film with an electrically conductive surface.

The mixture may be contacted with the electrically conductive surface, e.g., the first and/or second electrically conductive surface prior to allowing the gelating agent to set. Contacting the mixture or the gelated ionic liquid film with the electrically conductive surface may be effected by printing the mixture onto the electrically conductive surface, e.g., onto the first and/or second electrically conductive surface. The first electrically conductive surface may be an anode and the second electrically conductive surface may be a cathode.

The method may further comprise providing a third gelated ionic liquid film comprising a third encapsulated ionic liquid and in contact with a third electrically conductive surface; and contacting the second and third gelated ionic liquid films. The third electrically conductive surface may be an anode.

Any one or more of the first, second and/or third ionic liquids may comprise: (a) one or more anions selected from the group consisting of bromide, chloride, iodide, bis(trifluoromethylsulfonyl)imide, bis(fluorosulfonyl)imide, acetate, propionate, pentanoate, hexanoate, hexafluorophosphate, and tris(pentafluoro)trifluorophosphate; and/or (b) one or more cations selected from the group consisting of 1-butylpyridinium, 1-octylpyridinium, 1-(2-hydroxyethyl)pyridinium, 1-ethyl-3-methylimidazolium, 1-butyl-3-methylimidazolium, 1-pentyl-3-methylimidazolium, 1-hexyl-3-methylimidazolium, 1-(2-methoxyethyl)-3-methylimidazolium, 1-(1-methoxymethyl)-3-methylimidazolium, 1-methyl-3-octylimidazolium, 1-methyl-1-ethylpyrolidinium, 1-methyl-1-butylpyrrolidinium, 1-methyl-1-hexylpyrolidinium, 1-(2-methoxyethyl)-1-methylpyrrolidinium, 1-(1-methoxymethyl)-1-methylpyrrolidinium, tetrabutylphosphonium, tributyloctylphosphonium, tributyl(2-methoxyethyl)phosphonium, tributyl-tert-butylphosphonium, tributyl(1-methoxymethyl)phosphonium, tetraethylammonium, tetrabutylammonium, tributyloctylammonium, tributyl(2-methoxyethyl)ammonium, tributyl(1-methoxymethyl) ammonium, and tributyl-tert-butylammonium.

Any one or more of the first, second and/or third gelated ionic liquid films may further comprise an electrolyte salt. The first and/or second and/or third ionic liquid may comprise two or more cations and two or more anions that together form a eutectic mixture.

In one embodiment, the method according to the seventh aspect above comprises:

providing a first gelated ionic liquid film comprising a first encapsulated ionic liquid in contact with a first electrically conductive surface, wherein said providing comprises combining a first gelating agent with a first ionic liquid at a suitable temperature to produce a first mixture, and allowing the gelating agent to set and thereby form a first gelated ionic liquid film in which the ionic liquid is encapsulated; and contacting the mixture or the gelated ionic liquid film with a first electrically conductive surface; and providing a second gelated ionic liquid film comprising a second encapsulated ionic liquid in contact with a second electrically conductive surface, wherein said providing comprises combining a second gelating agent with a second ionic liquid at a suitable temperature to produce a second mixture, and allowing the gelating agent to set and thereby form a second gelated ionic liquid film in which the ionic liquid is encapsulated; and contacting the mixture or the gelated ionic liquid film with a second electrically conductive surface; and contacting the first and second gelated ionic liquid films.

In another embodiment, the method according to the seventh aspect above comprises:

providing a first gelated ionic liquid film comprising a first encapsulated ionic liquid in contact with a first electrically conductive surface, wherein said providing comprises combining a first gelating agent with a first ionic liquid at a suitable temperature to produce a first mixture, contacting the mixture with the first electrically conductive surface prior to allowing the gelating agent to set, and allowing the gelating agent to set, thereby forming the first gelated ionic liquid film in which the ionic liquid is encapsulated;

providing a second gelated ionic liquid film comprising a second encapsulated ionic liquid in contact with a second electrically conductive surface, wherein said providing comprises combining a second gelating agent with a second ionic liquid at a suitable temperature to produce a second mixture, contacting the mixture with the second electrically conductive surface prior to allowing the gelating agent to set, and allowing the gelating agent to set, thereby forming the second gelated ionic liquid film in which the ionic liquid is encapsulated; and contacting the first and second gelated ionic liquid films.

In yet another embodiment, the method according to the seventh aspect above comprises:

providing a first gelated ionic liquid film comprising a first encapsulated ionic liquid in contact with a first electrically conductive surface, wherein the first electrically conductive surface is an anode, wherein said providing comprises combining a first gelating agent with a first ionic liquid at a suitable temperature to produce a first mixture, contacting the mixture with the first electrically conductive surface prior to allowing the gelating agent to set, wherein said contacting is effected by printing the mixture onto the first electrically conductive surface, and allowing the gelating agent to set, thereby forming the first gelated ionic liquid film in which the first ionic liquid is encapsulated;

providing a second gelated ionic liquid film comprising a second encapsulated ionic liquid in contact with a second electrically conductive surface, wherein the second electrically conductive surface is a cathode, wherein said providing comprises combining a second gelating agent with a second ionic liquid at a suitable temperature to produce a second mixture, contacting the mixture with the second electrically conductive surface prior to allowing the gelating agent to set, wherein said contacting is effected by printing the mixture onto the second electrically conductive surface, and allowing the gelating agent to set, thereby forming the second gelated ionic liquid film in which the second ionic liquid is encapsulated; and contacting the first and second gelated ionic liquid films.

BRIEF DESCRIPTION OF FIGURES

Preferred embodiments of the present invention will now be described, by way of example only, with reference to the accompanying figures wherein.

DEFINITIONS

Figure 1:
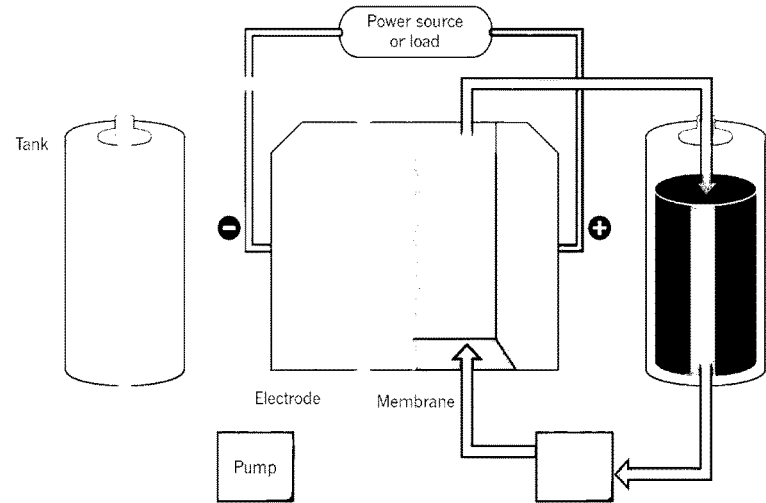
FIG. 1 provides a schematic illustration of the existing flow cell battery technology, and in particular, the large tanks required to carry the electrolyte and redox species.
Figure 2:
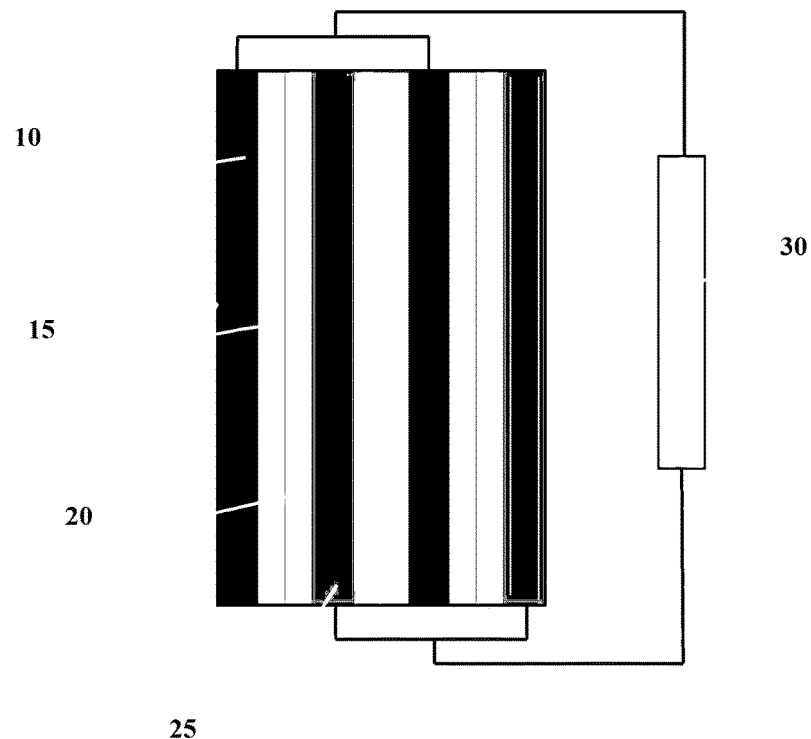
FIG. 2 provides an example of an electrochemical cell according to the present invention. Key: 10: anode, e.g., a redox active metal, transition metal, or group I or II metal, e.g., Li, Mg, Zn, Cu, Fe, Co, Mn, Cr, or graphite (carbon), nanotubes (carbon), or any non-reactive metal, e.g., platinum, gold, etc.; 15=gelated ionic liquid film in contact with the anode, comprising any suitable ionic liquid and additional dissolved redox species, e.g., an $M^{n+}$ ion, e.g., $Li^+$, $Mg^{2+}$, $Zn^{2+}$, $Cu^{+/2+}$, $Fe^{2+/3+}$, $Co^{2+/3+}$, $Mn^{2+}$, $Cr^{3+}$, etc.; 25: cathode, e.g., graphite (carbon), nanotubes (carbon), or any non-reactive metal, e.g., platinum, gold, etc.; 20: gelated ionic liquid film in contact with the cathode, comprising any suitable ionic liquid and additional dissolved redox species, e.g., $Cl_2$ and/or $Cl^-$; $Br_2$ and/or $Br^-$; $I_2$ and/or $I^-$; $MnO_4^-$ and/or $Mn^{2+}$; $CrO_4^{2-}$ and/or $Cr_2O_7^{2-}$; etc; 30: load or power source.

As used in this application, the singular form "a", "an" and "the" include plural references unless the context clearly dictates otherwise. For example, the phrase "additional dissolved redox species" includes one additional dissolved redox species and also includes two or more additional dissolved redox species.

As used herein, the term "comprising" means "including." Variations of the word "comprising", such as "comprise" and "comprises," have correspondingly varied meanings. Thus, for example, a gelated ionic liquid film "comprising" an ionic liquid encapsulated within a gel matrix may consist exclusively of that ionic liquid encapsulated within a gel matrix or may include one or more additional components (e.g. additional dissolved redox species, electrolyte species, etc.).

It will be understood that use the term "about" herein in reference to a recited numerical value includes the recited numerical value and numerical values within plus or minus ten percent of the recited value.

It will be understood that use of the term "between" herein when referring to a range of numerical values encompasses the numerical values at each endpoint of the range. For example, a temperature of between 80° C. and 150° C. is inclusive of a temperature of 80° C. and a temperature 150° C.

The terms 'gelated ionic liquid' and 'ionogel' are used interchangeably herein to denote an ionic liquid encapsulated within a gel matrix, and where it is apparent from the context that the ionogel is in the form of a layer or film, the terms 'gelated ionic liquid film' and 'ionogel' are also used interchangeably.

Any description of prior art documents herein, or statements herein derived from or based on those documents, is not an admission that the documents or derived statements are part of the common general knowledge of the relevant art.

For the purposes of description, all documents referred to herein are hereby incorporated by reference in their entirety unless otherwise stated.

DETAILED DESCRIPTION

The present invention relates to assemblies comprising gelated ionic liquid films in contact with electrically conductive surfaces, for example electrodes, where the solid-like properties of the gels enable the films to be physically immobilised on the conductive surfaces whilst the liquid-like properties of the encapsulated ionic liquids within the films enables movement of charge carrying species. Such assemblies are suited to a variety of applications, for example, formation of electrolytic cells. The assemblies according to the invention are particularly suited as alternatives to flow battery systems.

Gelated Ionic Liquid Film

The present invention provides an assembly that, for example, is suitable for use in electrochemical cells (e.g., batteries). The assembly may comprise a gelated ionic liquid film in contact with an electrically conductive surface. The gelated ionic liquid film may comprise an ionic liquid encapsulated within a gel matrix.

Gelating Agent/Gel Matrix

Encapsulation of an ionic liquid within a gel matrix may be achieved using any suitable technique. For example, an ionic liquid may be added to a pre-assembled gel matrix such that the ionic liquid then becomes encapsulated within the matrix. Alternatively, a gel matrix precursor or gelating agent may be combined with an ionic liquid such that the resultant gel matrix forms in or around the ionic liquid and thereby encapsulates it.

Non-limiting examples of pre-assembled gel matrices include silica sol-gels, which may be prepared by acid catalysed polymerisation of any suitable trialkoxysilane (e.g., trimethoxysilane or triethoxysilane) in any suitable templating ionic liquid. Methods of synthesising silica sol-gels with known structural properties, e.g., pore size and volume, particle size, surface area, etc. are known in the art (e.g., Menyen, V.; Cool, P. Vansant, E. F. "Verified Syntheses of mesoporous materials" *Micropor. Mesopor. Mater.* 2009, 125, 170-223), as are suitable templating ionic liquids (e.g., Antionetti, M.; Kuang, D.; Smarsly, B.; Zhou, Y. "Ionic liquids for the convenient synthesis of functional nanoparticles and other inorganic nanostructures" *Angew. Chem. Int. Ed.* 2004, 43, 4988-4992; Trewyn, B. G.; Whitman, C. M.; Lin, V. S.-Y. "Morphological control of room-temperature ionic liquid templated mesoporous silica nanoparticles for controlled relaes of antibacterial agents" *Nano Lett.* 2004, 4, 2139-2143; Wang, T.; Kaper, H.; Antionetti, M.; Smarsly, B. "Templating behaviour of a long-chain ionic liquid in the hydrothermal synthesis of mesoporous silica" *Langmuir* 2007, 23, 1489-1495; Yuen, A. K. L.; Heinroth, F.; Ward, A. J.; Masters, A. F.; Maschmeyer, T. "Novel bis(methylimidazolium)-alkane bolaamphiphiles as templates for super-microporous and mesoporous silicas" *Micropor. Mesopor. Mater.* 2012, 148, 62-72). The templating ionic liquid may be any suitable ionic liquid, e.g., it may be an ionic liquid as described herein in the section entitled 'Ionic Liquids'. The templating ionic liquid may be the ionic liquid encapsulated within the gel matrix, or the templating ionic liquid may be replaced by an ionic liquid as described herein in the section entitled 'Ionic Liquids' using methods known in the art, e.g., calcining the sol-gel to remove the template ionic liquid followed by introduction of a different ionic liquid by, e.g., incipient wetness methods.

Non-limiting examples of gel matrix precursors or gelating agents that may be combined with an ionic liquid to form an ionic liquid encapsulated within a gel matrix may include any substance capable of forming a 3 D network stabilised by one or more intermolecular forces, including, but not limited to, ion-dipole interactions, dipole-dipole interactions, and dispersion forces, e.g., hydrogen bonding, π-π stacking interactions, or any combinations thereof, either alone or in combination with one or more ionic liquids. Suitable gel matrix precursors or gelating agents may therefore include hydroxy-substituted organic compounds, polysaccharides, dipeptides, proteins, polymers, carbon nanotubes and functionalised silica nanospheres, and optionally any of the preceding substances when combined with an ionic liquid as described in the section entitled 'Ionic liquids'. The gel matrix precursors or gelating agents may be liquid in pure form, or they may be solid.

For example, the gel matrix precursor or gelating agent may be a substance capable of forming a 3D hydrogen-bonded network either alone or in combination with one or more ionic liquids. Non-limiting examples of such gelating agents may therefore include hydroxy-substituted organic compounds. Any suitable organic compound may be used, for example, the organic compound may be a carboxylic acid, e.g., a long chain ($C_{13}$-$C_{21}$) carboxylic or fatty acid. The fatty acid $C_{13}$-$C_{21}$ chain may be saturated or may be unsaturated, and/or may be linear, branched, or cyclic. The fatty acid may be aromatic. The fatty acid may comprise any other suitable functional groups, but preferably comprises one or more hydroxyl groups. Non-limiting examples of suitable hydroxy-substituted organic compound gelating agents may therefore include mono, di or trihydroxy-substituted fatty acids, e.g., hydroxypalmitic acid, hydroxystearic acid, hydroxyarachidic acid, e.g., 12-hydroxystearic acid. In accordance with the present invention, the hydroxy-substituted organic compounds described above may be combined with an ionic liquid as described in the section entitled 'Ionic Liquids' to form an ionic liquid encapsulated within a gel matrix using methods known in the art (e.g., Voss, B. A.; Bara, J. E.; Gin, D. L.; Noble, R. D. "Physically gelled ionic liquids: solid membrane materials with liquid-like $CO_2$ gas transport" *Chem. Mater.* 2009, 21, 3027-3029).

Other non-limiting examples of suitable gelating agents include polysaccharides. Any suitable polysaccharides may be chosen, e.g., polysaccharides comprising galactose monomers or their derivatives, or sorbitol monomers or their derivatives, e.g., agarose gel, 3,4-dimethyl-2,4-O-methyl-benzylidene-D-sorbitol and its derivatives, and guar gum. In accordance with the present invention, the polysaccharides described above may be combined with an ionic liquid as described in the section entitled 'Ionic Liquids' to form an ionic liquid encapsulated within a gel matrix using methods known in the art (e.g., Sun, S.; Song, J.; Feng, R.; Shan, Z. "Ionic liquid gel electrolytes for quasi-solid-state dye-sensitized solar cells" *Electrochim. Acta* 2012, 69, 51-55; Mohmeyer, N.; Wang, P.; Schmidt, H.-W.; Zakeeruddin, S. M.' Grätzel, M. "Quasi-solid-state dye sensitized solar cells with 1,3:2,4-di-O-benzylidene-D-sorbitol derivatives as low molecular weight organic gelators"*J. Mater. Chem.* 2004, 14, 1905-1909).

Further non-limiting examples of suitable gelating agents include dipeptides. Any suitable dipeptides may be chosen, e.g., dipeptides comprising phenylalanine or its derivatives, leucine or its derivatives, or asparagine or its derivatives, e.g., N-carbobenzyloxy-L-isoleucylamino-octadecane, and cyclo(L-β-3,7-dimethyloctylasparaginyl-L-phenylalanyine). Suitable gelating agents may also include proteins, such as collagen or its derivatives, a non-limiting example of which includes gelatin. In accordance with the present invention, the dipeptides and/or proteins described above may be combined with an ionic liquid as described in the section entitled 'Ionic Liquids' to form an ionic liquid encapsulated within a gel matrix using methods known in the art (Hanabusa, K.; Fukui, H.; Suzuki, M.; Shirai, H. "Specialist Gelator for Ionic Liquids" *Langmuir* 2005, 10383-10390; Smith, N. W.; Knowles, J.; Albright, J. G.; Dzyuba, S. V. "Ionic liquid-assisted gelation of an organic solvent" *J. Mol. Liquids* 2010, 157, 83-87; Kubo, W.; Kambe, S.; Nakade, S.; Kitamura, T.; Hanabusa, K.; Wada, Y.; Yanagida, S. "Photocurrent-Determining Processes in Quasi-Solid-State Dye-Sensitized Solar Cells Using Ionic Gel Electrolytes" *J. Phys. Chem. B* 2003, 107, 4374-4381; Hanabusa, K.; Hiratsuka, K.; Kimura, M.; Shirai, H. "Easy Preparation and Useful Character of Organogel Electrolytes Based on Low Molecular Weight Gelator" *Chem. Mater.* 1999, 11, 649-655; Voss, B. A.; Noble, R. D.; Gin, D. L.

"Ionic Liquid Gel-Based Containment and Decontamination Coating for Blister Agent-Contacted Substrates" *Chem. Mater.* 2012, 24, 1174-1180).

Further non-limiting examples of suitable gelating agents include amides. Any suitable amides may be chosen, e.g., amides comprising one or more alkanoylaminophenyl groups, e.g., bis(4-octanoylaminophenyl)ether, and bis(4-octanoylaminophenyl)-methane. In accordance with the present invention, the amides described above may be combined with an ionic liquid as described in the section entitled 'Ionic Liquids' to form an ionic liquid encapsulated within a gel matrix using methods known in the art (e.g., Tan, L.; Dong, X.; Wang, H.; Yang, Y. "Gels of ionic liquid [$C_4$mim]$PF_6$ formed by self-assembly of gelators and their electrochemical properties" *Electrochem. Commun.* 2009, 11, 933-936).

Still further non-limiting examples of suitable gelating agents may include polymers. Any suitable polymers may be chosen, e.g., polymers or copolymers comprising ethylene oxide, methyl methacylate, sulfonated tetrafluoroethylene, fluorinated vinylidene, and/or fluorinated propylene, e.g., poly(ethylene oxide), poly(methyl methacrylate), sulfonated tetrafluoroethylenes (Nafion®), or poly(vinylidene fluoride-co-hexafluoropropylene) (PVdF-HFP). In accordance with the present invention, the polymers described above may be combined with an ionic liquid as described in the section entitled 'Ionic Liquids' to form an ionic liquid encapsulated within a gel matrix using methods known in the art (e.g., Hong, S. U.; Park, D.; Ko, Y.; Baek, I. "Polymer-ionic liquid gels for enhanced gas transport" *Chem. Commun.* 2009, 7227-7229; Yoon, J.; Kang, D.; Won, J.; Park, J.-Y.; Kang, Y. S. "Dye-sensitized solar cells using ion-gel electrolytes for long-term stability" *J. Power Sources* 2012, 210, 395-401; Delaney, J. Y. J.; Liberski, A. R.; Perelaer, J.; Schubert, U. S. "A Practical Approach to the Development of Inkjet Printable Functional Ionogels—Bendable, Foldable, Transparent, and Conductive Electrode Materials" *Macromol. Rapid. Commun.* 2010, 31, 1970-1976).

Additional non-limiting examples of suitable gelating agents may include carbon nanotubes and graphenes (doped and non-doped), functionalised silica nanospheres, and silica sol-gels. For example, silica nanospheres may be functionalised with any suitable functional groups, e.g., silanol groups or propylamine groups. In accordance with the present invention, the carbon nanotubes, graphenes (doped and non-doped), or functionalised silica nanospheres may be combined with an ionic liquid as described in the section entitled 'Ionic Liquids' to form an ionic liquid encapsulated within a gel matrix using methods known in the art (Carbon nanotubes: e.g., Fukushima, T.; Kosaka, A.; Ishimura, Y.; Yamamoto, T.; Takigawa, T.; Ishii, N.; Aida, T. *Science* 2003, 300, 2072-2074; non-doped graphene: Zhu, Jixin; Yang, Dan; Yin, Zongyou; et al., *Small,* 2014, 10(17), 3480-3498; doped graphene: Wang, Xuewan; Sun, Gengzhi; Routh, Parimal; et al, *Chemical Society Reviews,* 2014, 43(20), 7067-7098; unfunctionalised silica nanosphere (i.e., silanol groups): e.g., Wang, P.; Zakeeruddin, S. M.; Comte, P.; Exnar, I.; Grätzel, M. *J. Am. Chem. Soc.* 2003, 125, 1166-1167; Stathatos, E.; Lianos, P.; Zakeeruddin, S. M.; Liska, P.; Grätzel, *M. Chem. Mater.* 2003, 15, 1825-1829; Berginc, M.; Hočevar, M.; Opara Krašovec, U.; Hinsch, A.; Sastrawan, R.; Topič, M. *Thin Solid Films* 2008, 516, 4645-4650; Shimano, S.; Zhou, H.; Honma, I. *Chem. Mater.* 2007, 19, 5216-5221; silica nanospheres functionalised with amines: e.g., Fang, Y.; Zhang, j.; Zhou, X.; Lin, Y.; Fang, S. *Electrochim. Acta* 2012, 68, 235-239; silica nanospheres functionalised with carboxylic acids: e.g., Fang, Y.; Zhang, D.; Zhou, X.; Lin, Y.; Fang, S. *Electrochem. Commun.* 2012, 16, 10-13; silica nanospheres functionalised with polymers: e.g., Ueno, K.; Hata, K.; Katakabe, T.; Kondoh, M.; Watanabe, M. *J. Phys. Chem. B* 2008, 112, 9013-9019; Ueno, K.; Imaizumi, S.; Hata, K.; Watanabe, M. *Langmuir* 2009, 25, 825-831; Ueno, K.; Inaba, A.; Sano, Y.; Kondoh, M.; Watanabe, M. *Chem. Commun.* 2009, 3603-3605; Ueno, K.; Inaba, A.; Ueki, T.; Kondoh, M.; Watanabe, M. *Langmuir* 2010, 26, 18031-18038; Ueno, K.; Sano, Y.; Inaba, A.; Kondoh, M.; Watanabe, M. *J. Phys. Chem. B* 2010, 114, 13095-13103). Silica sol-gels may be prepared by acid catalysed polymerisation of any suitable trialkoxysilane (e.g., trimethoxysilane or triethoxysilane) in any suitable ionic liquid as described herein in the section entitled 'Ionic Liquids'.

It will be understood that the gel matrix encapsulating an ionic liquid may comprise one gelating agent, or may comprise a mixture of any two or more gelating agents as described herein.

Ionic Liquids

An ionic liquid encapsulated within a gel matrix according to the present invention may be any suitable ionic liquid. For example, the ionic liquid may comprise any suitable anion, e.g., an anion selected from the group consisting of a halogen, an organic anion or an inorganic anion. Non-limiting examples of suitable halogen anions include bromide, chloride, and iodide. Non-limiting examples of suitable organic anions include sulfonylimides and carboxylates, e.g., bis(trifluoromethylsulfonyl)imide, bis(fluorosulfonyl)imide, acetate, propionate, pentanoate, hexanoate. Non-limiting examples of suitable inorganic anions include fluorinated phosphates, e.g., hexafluorophosphate, tris(pentafluoro)trifluorophosphate.

The ionic liquid may additionally comprise any suitable cation, e.g., a cation selected from the group consisting of alkyl-substituted heterocyclics, alkyl-substituted phosphonium cations and alkyl-substituted ammonium cations, where the alkyl group may be any unsaturated, saturated, linear, branched, cyclic non-aromatic, or aromatic $C_1$ to $C_{12}$ alkyl group or any unsaturated, saturated, linear, branched, cyclic non-aromatic, or aromatic optionally substituted $C_1$ to $C_{12}$ alkyl group, e.g., an ether substituted $C_1$ to $C_{12}$ alkyl group. Non-limiting examples of suitable alkyl-substituted heterocyclics cations include: alkylpyridinium cations, e.g., 1-butylpyridinium, 1-octylpyridinium and 1-(2-hydroxyethyl)pyridinium; dialkylimidazolium cations, e.g., 1-ethyl-3-methylimidazolium, 1-butyl-3-methylimidazolium, 1-pentyl-3-methylimidazolium, 1-hexyl-3-methylimidazolium, 1-(2-methoxyethyl)-3-methylimidazolium, 1-methyl-3-octylimidazolium, and 1-(1-methoxymethyl)-3-methylimidazoliura; and dialkylpyrrolidinium cations, e.g., 1-methyl-1-ethylpyrolidinium, 1-methyl-1-butylpyrrolidinium, 1-methyl-1-hexylpyrrolidinium, 1-(2-methoxyethyl)-1-methylpyrrolidinium and 1-(1-methoxymethyl)-1-methylpyrrolidinium. Non-limiting examples of suitable alkyl-substituted phosphonium cations include: tetraalkylphosphonium cations, e.g., tetrabutylphosphonium, tributyloctylphosphonium, tributyl(2-methoxyethyl)phosphonium, tributyl-tert-butylphosphonium and tributyl(1-methoxymethyl)phosphonium; and tetraalkylammonium cations, e.g., tetraethylammonium, tetrabutylammonium, tributyloctylammonium, tributyl(2-methoxyethyl)ammonium, tributyl (1-methoxymethyl)ammonium and tributyl-tert-butylammonium.

The ionic liquid encapsulated within a gel matrix according to the present invention may be tailored to the electrically conductive surface with which it will be in contact, e.g., where the electrically conductive surface is an active electrode, the ionic liquid encapsulated within the gel matrix may be chosen for its ion transport capacity, and where the electrically conductive surface is an inert electrode, the ionic liquid encapsulated within the gel matrix may be chosen for its ability to chemically interact with the species evolved from the electrically conductive surface.

Suitable and non-limiting classes of ionic liquids applicable for encapsulation in a gel in contact with an inert electrode may be selected from the group consisting of alkyl-substituted heterocyclic halides, alkyl-substituted phosphonium halides and alkyl-substituted ammonium halides. For example, the halide may be bromide. Non-limiting examples of such ionic liquids include: 1-butylpyridinium bromide, 1-octylpyridinium bromide, 1-(2-hydroxyethyl)pyridinium bromide, 1-ethyl-3-methylimidazolium bromide, 1-butyl-3-methylimidazolium bromide, 1-pentyl-3-methylimidazolium bromide, 1-hexyl-3-methylimidazolium bromide, 1-(2-methoxyethyl)-3-methylimidazolium bromide, 1-(1-methoxymethyl)-3-methylimidazolium bromide, 1-methyl-3-octylimidazolium bromide, 1-methyl-1-ethylpyrolidinium bromide, 1-methyl-1-butylpyrrolidinium bromide, 1-methyl-1-hexylpyrolidinium bromide, 1-(2-methoxyethyl)-1-methylpyrrolidinium bromide, 1-(1-methoxymethyl)-1-methylpyrrolidinium bromide, tetrabutylphosphonium bromide, tributyloctylphosphonium bromide, tributyl(2-methoxyethyl) phosphonium bromide, tributyl-tert-butylphosphonium bromide, tributyl(1-methoxymethyl)phosphonium bromide, tetraethylammonium bromide, tetrabutylammonium bromide, tributyloctylammonium bromide, tributyl(2-methoxyethyl)ammonium bromide, tributyl(1-methoxymethyl)ammonium bromide and tributyl-tert-butylammonium bromide.

By way of non-limiting example, when the chemical reaction at the inert electrode is represented by Equation 5:

$$X_2 + 2e^- \rightleftharpoons 2X^-$$  Equation 5 where X is a halogen (e.g., Cl, Br or I) or any other suitable oxidant, the ionic liquid encapsulated within the gel matrix in contact with the inert electrode may be able to immobilise $X_2$ near the surface of the electrode through interactions between the ionic liquid and the $X_2$ molecules. Hence, ionic liquids likely to be particularly suitable for encapsulation in a gel in contact with an inert electrode may include alkyl-substituted heterocyclic cations with $X^-$ anions, alkyl-substituted phosphonium cations with $X^-$ anions and alkyl-substituted ammonium cations with $X^-$ anions. Without being be bound by theory, the presence of $X^-$ anions in the ionic liquid may act as a "seed" for the formation of polyhalide species, e.g., when X is Br, polybromide species, which may in turn assist with immobilising the $X_2$ molecules in the ionic liquid encapsulated within the gel matrix. Further, these classes of cations may possess a shielded localised point charge and consequently have a high binding energy for the ion pair and a low dimerization energy for the anion-cation pair.

Classes of ionic liquids likely to be particularly suitable for encapsulation in a gel in contact with an active electrode may be selected from the group consisting of alkyl-substituted heterocyclic cations, alkyl-substituted phosphonium cations, and alkyl-substituted ammonium cations with anions including bis(trifluoromethylsulfonyl)-imide, bis(fluorosulfonyl)imide, hexafluoro-phosphate, tris(pentafluoro)trifluorophosphate, acetate, propionate, pentanoate and hexanoate.

For example, where the chemical reaction at the active electrode is represented by Equation 1, where M is any suitable metal, e.g., Li, Mg, Zn, Cu, Fe, Co, Mn, Cr, etc., the ionic liquid encapsulated within the gel matrix in contact with the active electrode may be able to facilitate movement of $M^{n+}$ ions.

It will be understood that ionic liquids suitable for encapsulation in a gel in contact with an active electrode may be equally suitable for encapsulation in a gel in contact with an inert electrode if, for example, the gel further comprises additional dissolved redox species capable of being oxidised or reduced at the inert electrode.

It will also be understood that the gel matrix encapsulating an ionic liquid may comprise one ionic liquid, or may comprise a mixture of two or more different ionic liquids as described herein. For example, the gel matrix in contact with a first electrode (e.g., anode) may encapsulate one ionic liquid, or may encapsulate a mixture of two or more different ionic liquids as described herein, and/or the gel matrix in contact with a second electrode (e.g., cathode) may encapsulate one ionic liquid, or may encapsulate a mixture of two or more different ionic liquids as described herein. One or more of the encapsulated ionic liquid(s) in the gel matrix in contact with the first electrode may be different to the one or more encapsulated ionic liquid(s) in the gel matrix in contact with the second electrode. Where a mixture of two different ionic liquids (designated as 'A' and 'B') is used, where each of 'A' and 'B' is an ionic liquid as described in this section entitled 'Ionic Liquids' and 'A' and 'B' are different, the proportion by weight of ionic liquid 'A' in the gel matrix may be between about 0.1 wt. % and about 50 wt. %, and the proportion by weight of ionic liquid 'B' in the gel matrix may be between about 50 wt. % and about 99.9 wt. %. For example, the gel matrix may comprise an ionic liquid mixture comprising about 50 wt. %) ionic liquid 'A' and about 50 wt. %) ionic liquid 'B', or may comprise an ionic liquid mixture comprising about 40 wt. % ionic liquid 'A' and about 60 wt. % ionic liquid 'B', or may comprise an ionic liquid mixture comprising about 30 wt. % ionic liquid 'A' and about 70 wt. % ionic liquid 'B', or may comprise an ionic liquid mixture comprising about 20 wt. % ionic liquid 'A' and about 80 wt. % ionic liquid 'B', or may comprise an ionic liquid mixture comprising about 1 wt. % ionic liquid 'A' and about 99 wt. %) ionic liquid 'B', or may comprise an ionic liquid mixture comprising about 40 wt. % ionic liquid 'A' and about 60 wt. % ionic liquid 'B'. In one embodiment, ionic liquid 'A' is a dialkylimidazolium halide, e.g., 1-methyl-3-octylimidazolium bromide, and ionic liquid 'B' is a dialkylimidazolium sulfonylimide, e.g., 1-methyl-3-octylimidazolium bis(trifluoromethylsulfonyl)imide. Accordingly, the gel matrix in contact with an electrode (e.g., inert or active electrode) may comprise a mixture of about 50 wt. % [OMIM]NTf₂ (octylimidazolium bis(trifluoromethylsulfonyl)imide) and 50 wt. % [OMIM]Br (1-methyl-3-octylimidazolium bromide).

Ionic liquids particularly suitable for encapsulation within a gel in contact with an inert electrode, e.g., in contact with an inert anode and/or an inert cathode, may be selected from the group consisting of 1-methyl-3-octylimidazolium bromide (abbreviated to [OMIM]Br), 1-methyl-3-octylimidazolium bis(trifluoromethylsulfonyl)imide (abbreviated to [OMIM]NTf₂), and mixtures thereof as described above.

In one embodiment, where two or more ionic liquids are encapsulated within the same gel matrix, the resultant mixture of ionic liquids may be a eutectic mixture.

Bromine Sequestering Ionic Liquids

As described above, the ionic liquid encapsulated within the gel matrix may be chosen for its ability to chemically interact with the species evolved from the electrically conductive surface. In one embodiment, the ionic liquid may be chosen for its ability to sequester, or bind, bond or otherwise chemically immobilise, certain species evolved from the electrically conductive surface. For example, the species may be a halide, e.g., bromine ($Br_2$), and the sequestering of the halide, e.g., bromine ($Br_2$) may be achieved through formation of polyhalide species, e.g., polybromides. Ionic liquids chosen in accordance with the present invention, and more particularly those chosen for encapsulation within a gelated ionic liquid film in contact with a cathode, may therefore be capable of facilitating formation of polyhalides, e.g., polybromides. Non-limiting examples of suitable ionic liquids, and non-limiting methods for screening other ionic liquids for suitability for this purpose, are outlined in Example 1.

For example, ionic liquids capable of facilitating the formation of polyhalides, e.g., polybromides, may include alkyl-substituted heterocyclic halides, alkyl-substituted phosphonium halides and alkyl-substituted ammonium halides. For example, where the halide is bromide, non-limiting examples ionic liquids capable of facilitating the formation of polybromides may include: 1-butylpyridinium bromide, 1-octylpyridinium bromide, 1-(2-hydroxyethyl) pyridinium bromide, 1-ethyl-3-methylimidazolium bromide, 1-butyl-3-methylimidazolium bromide, 1-pentyl-3-methylimidazolium bromide, 1-hexyl-3-methylimidazolium bromide, 1-(2-methoxyethyl)-3-methylimidazolium bromide, 1-(1-methoxymethyl)-3-methylimidazolium bromide, 1-methyl-3-octylimidazolium bromide, 1-methyl-1-ethylpyrolidinium bromide, 1-methyl-1-butylpyrrolidinium bromide, 1-methyl-1-hexylpyrolidinium bromide, 1-(2-methoxyethyl)-1-methylpyrrolidinium bromide, 1-(1-methoxymethyl)-1-methylpyrrolidinium bromide, tetrabutylphosphonium bromide, tributyloctylphosphonium bromide, tributyl(2-methoxyethyl)phosphonium bromide, tributyl-tert-butylphosphonium bromide, tributyl(1-methoxymethyl)phosphonium bromide, tetraethylammonium bromide, tetrabutylammonium bromide, tributyloctylammonium bromide, tributyl(2-methoxyethyl)ammonium bromide, tributyl(1-methoxymethyl)ammonium bromide and tributyl-tert-butylammonium bromide. Without being be bound by theory, the presence of $Br^-$ anions in these ionic liquids may act as a "seed" for the formation of polybromide species, and the cations in these ionic liquids may possess a shielded localised point charge and consequently have a high binding energy for the ion pair and a low dimerization energy for the anion-cation pair.

Gelated Ionic Liquids

The gel matrix encapsulating an ionic liquid may comprise any suitable proportion by mass of gel matrix precursor/gelating agent relative to the mass of ionic liquid. For example, the gel matrix encapsulating an ionic liquid may comprise from about 1 wt % to about 30 wt % gel matrix precursor, gelating agent, or pre-assembled gel matrix, e.g. the gel matrix may comprise from about 1 wt % to about 10 wt %, or from about 10 wt % to about 20 wt %, or from about 20 wt % to about 30 wt % gel matrix precursor, gelating agent, or pre-assembled gel matrix. The proportion by mass of gel matrix precursor/gelating agent or pre-assembled gel matrix relative to the mass of ionic liquid may be measured prior to formation of the gel, and therefore these values may vary in the final gel or gelated ionic liquid film product.

The gel matrix encapsulating an ionic liquid may further comprise any suitable electrolyte salt. The electrolyte salt may include, for example, halogen ions and group I or II metal ions, e.g., sodium chloride. The electrolyte salt may be soluble in the ionic liquid encapsulated in the gel matrix. The electrolyte salt may be added to the gelating agent and ionic liquid during synthesis of the gel matrix, or may be passively diffused into the gel matrix once it has formed. The proportion by mass of electrolyte salt in the gel matrix may be from 0 wt % to about 20 wt %, e.g., the proportion by mass of electrolyte salt in the gel matrix may be between 0 wt % and about 5 wt %, or between about 5 wt % and about 10 wt %, or between about 10 wt % and about 20 wt %, e.g., may be 0 wt %, about 5 wt %, about 10 wt %, about 15 wt % or about 20 wt %.

The gel matrix encapsulating an ionic liquid or gelated ionic liquid film may further comprise any suitable additional dissolved redox species. The additional dissolved redox species in the gel matrix or gelated ionic liquid film may be chosen according to the electrically conductive surface with which the gel matrix or film will be in contact. For example, where the chemical reaction at the active electrode is represented by Equation 1, where M is any suitable metal, e.g., a redox active metal, transition metal, or group I or II metal, e.g., Li, Mg, Zn, Cu, Fe, Co, Mn, Cr, etc., the additional dissolved redox species may be an $M^{n+}$ ion, e.g., $Li^+$, $Mg^{2+}$, $Zn^{2+}$, $Cu^{+/2+}$, $Fe^{2+/3+}$, $Co^{2+/3+}$, $Mn^{2+}$, $Cr^{3+}$, etc. In another non-limiting example, where the chemical reaction at the inert electrode is also represented by Equation 1, where M is any suitable metal, e.g., a redox active metal, transition metal, or group I or II metal, e.g., Li, Mg, Zn, Cu, Fe, Co, Mn, Cr, etc., the additional dissolved redox species may be an $M^{n+}$ ion, e.g., $Li^+$, $Mg^{2+}$, $Zn^{2+}$, $Cu^{+/2+}$, $Fe^{2+/3+}$, $Co^{2+/3+}$, $Mn^{2+}$, $Cr^{3+}$, etc. The additional dissolved redox species may be present in the gel matrix and/or ionic liquid encapsulated therein and/or in the resultant gelated ionic liquid film in any suitable concentration. The additional dissolved redox species may have any suitable counter-ion, e.g., an inorganic counter-ion, e.g., acetate, nitrate, or sulfate, or an organic counter-ion, e.g., triflate (trifluoromethanesulfonate). In one embodiment, the additional dissolved redox species is $Zn(OTf)_2$. Where the chemical reaction at the inert electrode is represented by Equation 2, where R is any suitable oxidant, for example, a halogen (e.g., $Cl_2$, $Br_2$, $I_2$), oxygen, permanganate, dichromate, perchlorate, etc. and $R^{n-}$ is the reduced form of R, the additional dissolved redox species in the gel matrix may be R and/or may be $R^{n-}$ species, e.g., the additional dissolved redox species in the gel matrix may be $Cl_2$ and/or $Cl^-$; $Br_2$ and/or $Br^-$; $I_2$ and/or $I^-$; $MnO_4^-$ and/or $Mn^{2+}$; $CrO_4^{2-}$ and/or $Cr_2O_7^{2-}$; etc. Where the additional dissolved redox species in the gel matrix is $R^{n-}$, the $R^{n-}$ may have any suitable counter-ion. For example, the counter-ion may be a metal cation, e.g., a metal cation with a large negative standard reduction potential, e.g., $Li^+$, $K^+$, $Ca^{3+}$, $Na^+$, or $Mg^{2+}$. Accordingly, in one embodiment, the additional dissolved redox species is LiBr.

The gel matrix encapsulating an ionic liquid and/or gelated ionic liquid film may comprise one additional dissolved redox species as described above or may comprise a mixture of two or more additional dissolved redox species as described above. For example, the additional dissolved redox species in the gel matrix may comprise R species (e.g., $Br_2$) and may also comprise $R^{n-}$ species (e.g., in the form of dissolved LiBr), and may optionally further comprise a $M^{n+}$ ion, e.g., $Li^+$, $Mg^{2+}$, $Zn^{2+}$, $Cu^{+/2+}$, $Fe^{2+/3+}$, $Co^{2+/3+}$, $Mn^{2+}$, $Cr^{3+}$ having any suitable counter-ion, e.g., acetate, nitrate, sulfate, or triflate (trifluoromethanesulfonate).

The additional dissolved redox species may be present in the gel matrix and/or ionic liquid encapsulated therein and/or in the gelated ionic liquid film in any suitable concentration. The proportion by mass of each additional dissolved redox species in the gel matrix or film may be from 0 wt % to about 20 wt %, e.g., the proportion by mass of the additional dissolved redox species in the gel matrix or film may be between 0 wt % and about 5 wt %, or between about 5 wt % and about 10 wt %, or between about 10 wt % and about 20 wt %, e.g., the proportion by mass of the additional dissolved redox species in the gel matrix or film may be 0 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt % or about 20 wt %.

The additional dissolved redox species described in this section may be added to the gelating agent and ionic liquid during synthesis of the gel matrix, or may be passively diffused into the gel matrix once it has formed.

The gel and/or gelated ionic liquid films may further comprise a solvent. For example, if a solvent has been used to dissolve, swell or suspend the gelating agent, the gel and/or gelated ionic liquid films may contain residual or trace amounts of this solvent. If the gel and/or gelated ionic liquid film is allowed to set under standard laboratory conditions, the residual solvent amount in the gel or gelated ionic liquid film may be between about 0 wt % and about 25 wt %, e.g., between about 0 wt % and about 5 wt %, between about 5 wt % and about 10 wt %, between about 10 wt % and about 15 wt %, or between about 15 wt % and about 25 wt %. Any suitable solvent may be used. For example, the solvent may be an organic solvent, e.g., an organic solvent having a suitably wide electrochemical window so as not to interfere with the electrochemical processes of the electrochemical cell. For example, the solvent may be acetone or it may be acetonitrile.

The gel may be thermally stable up to any suitable temperature, e.g., it may be stable up to at least about 150° C., at least about 160° C., or at least about 180° C. The gel may have any suitable electrochemical stability, e.g., it may have an electrochemical stability that is greater than the electrochemical window of the redox couple, e.g., the $M/M^{n+}$ and $R/R^{n-}$ redox couple, e.g., $Zn/Zn^{2+}$ and $Br_2/Br^-$ (−0.83 V for $Zn/Zn^{2+}$ and 1.07 V for $Br_2/Br^-$).

Non-limiting examples of gelated ionic liquids made in accordance with the present invention are given in Example 2. Non-limiting examples of gelated ionic liquids made in accordance with the present invention comprising additional dissolved redox species are given in Example 3, Example 4 and Example 8.

Gelated Ionic Liquid Films (GILFs)

A gelated ionic liquid film in accordance with the present invention comprises an ionic liquid encapsulated within a gel matrix. The gel matrix may be as described in the section entitled 'Gelating agent/Gel matrix'. The encapsulated ionic liquid may be as described in the section entitled 'Ionic liquids'. The gelated ionic liquid films may comprise other species, e.g., electrolyte salts and/or other aqueous redox species and/or may have certain physical and/or chemical properties as described in the section entitled 'Gelated ionic liquids'.

It will be understood by persons skilled in the art that the gel matrix encapsulating an ionic liquid may be formed into a film, thereby becoming a gelated ionic liquid film, using any suitable film-forming technique.

Assembly

Electrically Conductive Surface

An assembly as described herein may comprise a gelated ionic liquid film in contact with an electrically conductive surface. The contacting may be effected, for example, by printing the mixture onto the electrically conductive surface. The electrically conductive surface may conduct electricity. The electrically conductive surface may be an electrode, e.g., an anode or a cathode. The anode and/or cathode may be inert, e.g., it may be graphite (carbon), nanotubes (carbon), graphene composite (carbon), or any non-reactive metal, e.g., platinum, gold, titanium, or mixtures thereof etc. Preferably, the cathode is inert. The anode or cathode may alternatively be active (i.e., reactive), e.g., it may be any suitable reactive metal e.g., a transition metal including Fe, Zn, Ni, Cu, Mn, etc. The anode and cathode may be made from the same material. For example, in one embodiment, both the anode and the cathode comprise or consist of graphite (carbon), e.g., carbon paper, or a graphene composite. In another embodiment, both the anode and the cathode comprise or consist of titanium, e.g., titanium mesh. The terms 'anode' and 'cathode' as used in this section and elsewhere in the description and claims refer to the anode (i.e., site of oxidation) and cathode (i.e., site of reduction) when a complete circuit comprising the anode and cathode is operating in a spontaneous direction (i.e., during discharge), unless the context indicates otherwise.

Contact Conditions

An assembly in accordance with the present invention comprising a gelated ionic liquid film in contact with an electrically conductive surface may be manufactured using any suitable method. For example, the gelated ionic liquid film may be contacted with the electrically conductive surface by application of an ionic liquid encapsulated within a gel matrix onto the electrically conductive surface using film forming techniques known in the art, including spreading, evaporative drying, dip coating, etc. The ionic liquid encapsulated within a gel matrix may be formed into a film prior to contacting with the electrically conductive surface. Alternatively, the ionic liquid encapsulated within a gel matrix may form into a film once applied to the electrically conductive surface, e.g., the ionic liquid encapsulated within a gel matrix may be applied to the electrically conductive surface using any of the preceding film forming techniques whilst it is melted, e.g., at a temperature of between about 80° C. and about 150° C., and then allowed to set on the electrically conductive surface to form a gelated ionic liquid film thereon. The film may be applied to one side and/or face of the electrically conductive surface, or may be applied to all sides and/or faces of the electrically conductive surface.

The contact between the gelated ionic liquid film and the electrically conductive surface may be strengthened by attractive interactions between the film and the surface.

An assembly in accordance with the present invention may also be manufactured by printing a mixture of a gelating agent and an ionic liquid onto an electrically conductive surface. Any suitable printing technique may be used; for example, the printing may be inkjet and/or 3D printing. Where an inkjet/3D printing technique is used, the mixture of a gelating agent and an ionic liquid may be printed or deposited onto the electrically conductive surface. The mixture of a gelating agent and an ionic liquid may be deposited on the electrically conductive surface by the printer prior to the mixture setting. In this way, the printer may enable formation of a gelated ionic liquid film of known or tunable thickness on the electrically conductive surface. The printing may comprise depositing a first layer of a mixture of a gelating agent and an ionic liquid on an electrically conductive surface, or may comprise depositing a first and second layer of a mixture of a gelating agent and an ionic liquid on an electrically conductive surface, wherein the second layer is deposited over the first layer and wherein the second layer may comprise the same or different gelating agent and/or ionic liquid to the first layer. The printing may further comprise depositing a third, fourth, fifth, or subsequent layer of a mixture of a gelating agent and an ionic liquid on the electrically conductive surface such that a desired thickness and/or number of layers is achieved. The printing may comprise depositing one or more layer(s) of a mixture of a gelating agent and an ionic liquid on one side and/or face of the electrically conductive surface, or may comprise depositing one or more layer(s) of a mixture of a gelating agent and an ionic liquid on all sides and/or faces of the electrically conductive surface.

The gelated ionic liquid film may have a thickness of from about 50 µm to about 10 mm, e.g., between about 50 µm and about 1 mm, or between about 100 µm and about 10 mm, or between about 100 mm and about 1 mm, or between about 0.5 mm and about 1 mm, or between about 1 mm and about 5 mm, or between about 5 mm and about 10 mm.

The gelated ionic liquid film may cover or coat up to 100% of the surface area of the electrically conductive surface, or up to about 99%, or up to about 95%, or up to about 90%, about 80%, about 70%, about 60%, or up to about 50% of the surface area of the electrically conductive surface. Where the electrically conductive surface is an electrode, and the electrode comprises two substantially large surface area faces, the gelated ionic liquid film may coat up to about 100% of the surface area of either one of or both of those faces, or up to about 99%, or up to about 95%, or up to about 90%, about 80%, about 70%, about 60%, or up to about 50% of the surface area of either one of or both of those faces.

An assembly in accordance with the present invention and as described in this section may comprise a first gelated ionic liquid film in contact with a first electrically conductive surface, wherein the first gelated ionic liquid film comprises an ionic liquid encapsulated within a gel matrix. The first gelated ionic liquid film may comprise a gel matrix as described in the section entitled 'Gelating agent/Gel matrix', an encapsulated ionic liquid as described in the section entitled 'Ionic liquids', and optionally other species, e.g., electrolyte salts and/or additional dissolved aqueous redox species as described in the section entitled 'Gelated ionic liquids'. The first electrically conductive surface may be as described in the section entitled 'Electrically conductive surface', and the first gelated ionic liquid film may be contacted with the first electrically conductive surface as described in the section entitled 'Contact conditions'.

The assembly in accordance with the present invention and as described in this section may further comprise a second gelated ionic liquid film in contact with a second electrically conductive surface, wherein the second gelated ionic liquid film comprises an ionic liquid encapsulated within a gel matrix, and wherein the first and second liquid films are in contact with each other. When in contact with each other, the first and second liquid films may be immiscible. The second gelated ionic liquid film may comprise a gel matrix as described in the section entitled 'Gelating agent/Gel matrix', an encapsulated ionic liquid as described in the section entitled 'Ionic liquids', and optionally other species, e.g., electrolyte salts and/or additional dissolved redox species as described in the section entitled 'Gelated ionic liquids'. The second electrically conductive surface may be as described in the section entitled 'Electrically conductive surface', and the second gelated ionic liquid film may be contacted with the second electrically conductive surface as described in the section entitled 'Contact conditions'. Preferably, the first electrically conductive surface is an anode, and the second electrically conductive surface is a cathode. More preferably, the anode is an inert anode, and the cathode is an inert cathode.

The assembly in accordance with the present invention and as described in this section may still further comprise a third gelated ionic liquid film in contact with a third electrically conductive surface, wherein the third gelated ionic liquid film comprises a third ionic liquid encapsulated within a gel matrix; and wherein the second and third liquid films are at least partially in contact. When in contact with each other, the second and third liquid films may be immiscible. The third gelated ionic liquid film may comprise a gel matrix as described in the section entitled 'Gelating agent/Gel matrix', an encapsulated ionic liquid as described in the section entitled 'Ionic liquids', and optionally other species, e.g., electrolyte salts and/or additional dissolved redox species as described in the section entitled 'Gelated ionic liquids'. The third electrically conductive surface may be as described in the section entitled 'Electrically conductive surface', and the third gelated ionic liquid film may be contacted with the second electrically conductive surface as described in the section entitled 'Contact conditions'. Preferably, the third electrically conductive surface is an anode.

In accordance with the present invention, when the second and third gelated ionic liquid films are in contact, the first and third gelated ionic liquid films are not in contact with each other. Accordingly, in one embodiment, the first gelated ionic liquid film is in contact with one face or side of the second gelated ionic liquid film, which is itself in contact with the second electrically conductive surface, and the third gelated ionic liquid film is in contact with another (e.g., opposing or parallel) face or side of the second gelated ionic liquid film.

The assembly according to the invention may yet further comprise a fourth gelated ionic liquid film in contact with a fourth electrically conductive surface, and optionally a fifth gelated ionic liquid film in contact with a fifth electrically conductive surface, up to an nth gelated ionic liquid film in contact with an nth electrically conductive surface, where n is a positive integer. Preferably, the assembly according to the invention comprises an even number of gelated ionic liquid films in contact with electrically conductive surfaces. Accordingly, in one embodiment, every first electrically conductive surface is an anode, and every second electrically conductive surface is a cathode.

Electrochemical Cell Construction

The present invention also provides for an electrochemical cell comprising an assembly as described above in the section entitled 'Assembly'. More particularly, the present invention provides for an electrochemical cell comprising at least a first gelated ionic liquid film in contact with a first electrically conductive surface and a second gelated ionic liquid film in contact with a second electrically conductive surface, wherein the first and second gelated ionic liquid films comprise an ionic liquid encapsulated within a gel matrix, and wherein the first and second liquid films are in contact with each other.

The present invention also provides for an electrochemical cell comprising a first gelated ionic liquid film in contact with a first electrically conductive surface, wherein the first gelated ionic liquid film comprises a first ionic liquid encapsulated within a gel matrix, and a second gelated ionic liquid film in contact with a second electrically conductive surface, wherein the second gelated ionic liquid film comprises a second ionic liquid encapsulated within a gel matrix, wherein the first and second liquid films are at least partially in contact. The term 'partially in contact' may refer to the liquid films being at least about 30% overlapping, or at least about 40%, 50%, 60%, 70%, 80%, 90%, 99%, or up to about 100% overlapping, where the size of the region of overlap is equal or approximately equal for both films.

As described above in the section entitled 'Assembly', the first and/or second gelated ionic liquid film may comprise a gel matrix as described in the section entitled 'Gelating agent/Gel matrix', an encapsulated ionic liquid as described in the section entitled 'Ionic liquids', and optionally other species, e.g., electrolyte salts and/or other aqueous redox species as described in the section entitled 'Gelated ionic liquids'. The first and/or second electrically conductive surfaces may be as described in the section entitled 'Electrically conductive surface', and the first and/or second gelated ionic liquid film may be contacted with the first and/or second electrically conductive surface, respectively, as described in the section entitled 'Contact conditions'. Preferably, the first electrically conductive surface is an anode, and the second electrically conductive surface is a cathode. More preferably, the anode is an active anode, and the cathode is an inert cathode.

The electrochemical cell described above may further comprise a third gelated ionic liquid film in contact with a third electrically conductive surface, wherein the third gelated ionic liquid film comprises a third ionic liquid encapsulated within a gel matrix, and wherein the second and third liquid films are at least partially in contact. The second and third liquid films may be immiscible when in contact with each other. The third ionic liquid film may comprise a gel matrix as described in the section entitled 'Gelating agent/Gel matrix', an encapsulated ionic liquid as described in the section entitled 'Ionic liquids', and optionally other species, e.g., electrolyte salts and/or other aqueous redox species as described in the section entitled 'Gelated ionic liquids'. The third electrically conductive surface may be as described in the section entitled 'Electrically conductive surface', and the third gelated ionic liquid film may be contacted with the third electrically conductive surface as described in the section entitled 'Contact conditions'. Preferably, the third and first electrically conductive surfaces are anodes and the second electrically conductive surface is a cathode. More preferably, the anodes are inert anodes, and the cathode is an inert cathode.

As outlined above for the assembly according to the invention, the electrochemical cell according to the invention may further comprise a fourth gelated ionic liquid film in contact with a fourth electrically conductive surface, optionally a fifth gelated ionic liquid film in contact with a fifth electrically conductive surface, and optionally up to an nth gelated ionic liquid film in contact with an nth electrically conductive surface, where n is a positive integer.

The electrochemical cell may therefore comprise two or more assemblies, e.g., two or more alternating anodes and/or cathodes, wherein each anode and cathode is in contact with its own gelated ionic liquid film. Preferably, the gelated ionic liquid films in contact with adjacent anode and cathode surfaces are also in contact with each other, such that ion transport between the two gelated ionic liquid films is enabled.

The ionic liquids encapsulated in the gel matrices of the gelated ionic liquid films may also alternate, such that the ionic liquid encapsulated in the gel matrix in contact with the anode has one composition, and the ionic liquid encapsulated in the gel matrix in contact with the cathode has a different composition. Preferably, the ionic liquid encapsulated in the gel matrix in contact with the anode is immiscible with the ionic liquid encapsulated in the gel matrix in contact with the cathode, such that the gelated ionic liquid film in contact with the anode is immiscible with the gelated ionic liquid film in contact with the cathode. This may advantageously prevent the gelated ionic liquid films from intermixing when in contact with each other, whilst still allowing ion transport between the films. In some embodiments, mutually miscible ionic liquids are used in the anode and cathode films where the gel films sufficiently immobilise the ionic liquids and thus prevent them from intermixing or substantially intermixing.

The gelated ionic liquid films may also be immiscible with each other. In the context of gelated ionic liquid films, 'immiscible' may refer to the gel matrix of one film being physically distinct or separable from the gel matrix of another film, even though ion transport may be enabled between the films when they are in contact with each other. Accordingly, the gel matrix of one film may be derived from the same gelating agent as the gel matrix of another film, but by virtue of, e.g., separate synthesis of the two films, the films may be immiscible when in contact with each other. For example, the first and second gelated ionic liquid films may be immiscible when in contact with each other, and the second and third gelated ionic liquid films may be immiscible when in contact with each other. The gelated ionic liquid films may be immiscible with each other when the ionic liquids encapsulated within the gel matrices are immiscible, or when the ionic liquids are mutually miscible. Accordingly, in one embodiment, the first and second (or second and third) gelated ionic liquid films comprise mutually miscible ionic liquids, but the films themselves are immiscible when in contact with each other. In another embodiment, the first and second (or second and third) gelated ionic liquid films comprise immiscible ionic liquids, and the films themselves are immiscible when in contact with each other.

The assemblies may be connected to an external circuit using any suitable means, e.g., using any suitable electrically conductive material of any suitable size or shape. For example, the external circuit may comprise wires, e.g., metal wires, as a means to connect to one or more external devices, e.g., devices to measure current, voltage, and/or resistance, or means to connect to one or more loads for discharging, or means to connect to one or more power supplies to enable recharging. The external circuit may thus include any suitable device(s) to transport and/or moderate the electrical energy for consumption in an external application. The external circuitry may be connected to the anode(s) and cathode(s) using any suitable method, e.g., clamping, welding, or fixing using adhesives, e.g., epoxy resins, etc. such that electron flow to or from the anode or cathode through the external circuitry is enabled.

In one embodiment, the anodes and cathodes in each assembly may be flat or substantially flat in shape, for example, flat square or rectangular sheets or substantially flat square or rectangular prisms, and the gelated ionic liquid film in contact with each anode or cathode may cover up to 100% of the available anode or cathode surface area, or up to 95%, 90%), 85%, 80%) or 70% of the available anode or cathode surface area. The available anode or cathode surface area may be the total surface area of the anode or cathode minus the surface area required to connect the anode or cathode to an external circuit and/or support the anode or cathode in a stack. For example, the gelated ionic liquid film in contact with each anode or cathode may cover up to 100% of each of the substantially flat surfaces of the cathode or anode, optionally also covering each edge or edge face. The size and shape of each anode and cathode may be the same or may differ. The % area coverage of gelated ionic liquid films on each anode or cathode similarly may be the same or may differ.

Where the anodes and cathodes in each assembly are substantially flat in shape, the assemblies may be stacked together such that the substantially flat surfaces are at least partially in contact. For example, the stacking arrangement may be such that the flat or substantially flat surface of the anode is in contact with the entire flat or substantially flat surface of its adjacent cathode(s). In one embodiment, the substantially flat surface of the anode is in partial contact with the substantially flat surface of its adjacent cathode(s), and the anodes and cathodes in the stack are staggered such that the anodes extend beyond the contact area in one direction, and the cathodes extend beyond the contact area in the opposite direction. The stacked assemblies may be encased using any suitable encasing structure.

Method of Producing an Assembly

The present invention also provides for a method of producing an assembly as described in the preceding sections comprising providing a first gelated ionic liquid film comprising a first encapsulated ionic liquid in contact with a first electrically conductive surface; and providing a second gelated ionic liquid film comprising a second encapsulated ionic liquid in contact with a second electrically conductive surface; and contacting the first and second gelated ionic liquid films. In this method of producing an assembly, 'providing' may comprise combining a gelating agent (e.g., a liquefied or solid gelating agent) with an ionic liquid at a suitable temperature to produce a mixture, and allowing the mixture to set and thereby form a gelated ionic liquid film in which the ionic liquid is encapsulated, and contacting the mixture or the gelated ionic liquid film with an electrically conductive surface. The first and second (and third, fourth, etc.) gelated ionic liquid films may be provided in this way.

The gelating agent may be as described in the section entitled 'Gelating agent/gel matrix' and the ionic liquid may be as described in the section entitled 'Ionic liquids'.

In the above method of producing an assembly, the liquefied mixture may be contacted with the electrically conductive surface prior to allowing the liquefied mixture to set. In doing so, a greater proportion of the available surface area of the electrically conductive surface may be covered by, and thus interact with, the liquefied mixture (and thus the resultant gelated ionic liquid film) relative to if the gelated ionic liquid film is set prior to contacting it with the electrically conductive surface. The contacting may, for example, be effected by printing the mixture onto the first electrically conductive surface.

Preferably, the first electrically conductive surface is an anode and the second electrically conductive surface is a cathode.

The method above may still further comprise providing a third gelated ionic liquid film comprising a third encapsulated ionic liquid and in contact with a third electrically conductive surface, and contacting the second and third gelated ionic liquid films. Preferably, the third electrically conductive surface is an anode.

As described above, any one or more of the first, second and/or third ionic liquids may comprise an anion selected from any one or more of bromide, chloride, iodide, bis (trifluoromethylsulfonyl)imide, bis(fluorosulfonyl)imide, acetate, propionate, pentanoate, hexanoate, hexafluorophosphate, and tris(pentafluoro)trifluorophosphate and/or a cation selected from any one or more of 1-butylpyridinium, 1-octylpyridinium, 1-(2-hydroxyethyl)pyridinium, 1-ethyl-3-methylimidazolium, 1-butyl-3-methylimidazolium, 1-pentyl-3-methylimidazolium, 1-hexyl-3-methylimidazolium, 1-(2-methoxyethyl)-3-methylimidazolium, 1-(1-methoxymethyl)-3-methylimidazolium, 1-methyl-3-octylimidazolium, 1-methyl-1-ethylpyrolidinium, 1-methyl-1-butylpyrrolidinium, 1-methyl-1-hexylpyrolidinium, 1-(2-methoxyethyl)-1-methylpyrrolidinium, 1-(1-methoxymethyl)-1-methylpyrrolidinium, tetrabutylphosphonium, tributyloctylphosphonium, tributyl (2-methoxyethyl)phosphonium, tributyl-tert-butylphosphonium, tributyl(1-methoxymethyl)phosphonium, tetraethylammonium, tetrabutylammonium, tributyloctylammonium, tributyl(2-methoxyethyl)ammonium, tributyl(1-methoxymethyl) ammonium, and tributyl-tert-butylammonium as described in the section entitled 'Ionic liquids'. The first, second and/or third gelated ionic liquid film may optionally comprise other species, e.g., electrolyte salts and/or other aqueous redox species as described in the section entitled 'Gelated ionic liquids'. The first, second and/or third electrically conductive surface may be as described in the section entitled 'Electrically conductive surface', and the first, second and/or third gelated ionic liquid film may be contacted with the first, second and/or third electrically conductive surface, respectively, as described in the section entitled 'Contact conditions'.

EXAMPLES

The present invention will now be described with reference to specific examples, which should not be construed as in any way limiting Example 1: Synthesis and Characterisation of Ionic Liquid Polybromide Formation This example presents the results of a study into a range of ionic liquid cations capable of forming polybromide species (see Scheme 1). The bromine sequestering agent (BSA) [$C_2$MPyr]Br was used as a model, and the cyclic structure 1-alkyl-1-methylpiperdinium ($C_2$MPipBr), its aromatic analogue, 1-ethylpyridinium ([$C_2$Py]Br) and its ethoxy-substituted analogue, 1-(2-hydroxyethyl)pyridinium ([$C_2$OHPy]Br) and alkylammonium bromide salts ([$N_{n,n,n,n}$]Br) were studied.

Scheme 1

| Structure | (pyrrolidinium Me,R) | (piperidinium Me,R) | (pyridinium R) | (imidazolium R,Me) | (ammonium R,R',R'',R''') |
|---|---|---|---|---|---|
| Abbreviation | $C_nMPyrBr$ | $C_nMPipBr$ | $C_nPyBr$ | $C_nMIMBr$ | $N_{n,n,n,n}Br$ |
| R = | $C_{2/4/6}H_{5/9/13}$ | $C_{2/4/6}H_{5/9/13}$ | $C_2H_5/C_2OH$ | $C_{2/4/6}H_{5/9/13}$ | $C_{2/4/8}H_{5/9/17}$ |

(a) Ionic Liquid Synthesis:

Tetraethyl and tetrabutylammonium bromide were sourced from Sigma Aldrich. Other ionic liquids were prepared by quaternisation of the required tertiary amine with the respective bromoalkane (Sigma Aldrich) as per literature methods (Burrell, A. K., et al., *The large scale synthesis of pure imidazolium and pyrrolidinium ionic liquids*. Green Chemistry, 2007. 9(5): p. 449-454).

(b) Poly Bromide Preparation:

Most of the studied ionic liquids are white crystalline powders at room temperature. While all starting compounds are soluble in aqueous solutions, the resulting polybromide species form a separate phase. To examine their behavior in solution by both Raman spectroscopy and $^1H$ NMR, ionic liquids were dissolved in methanol:acetonitrile (1:10) mixture which was capable of dissolving all studied ionic liquids and their respective polybromides at the required concentrations. 1 M solutions of ionic liquid were prepared prior to sequential volumetric addition of bromine at $Br_2$:IL molar ratios of 0.8, 1.0, 1.2, 1.4, 1.6 and 1.8:1.

(c) Raman Spectroscopy:

IL-polybromides were sub-sampled in glass capillaries after each addition of liquid bromine and flame sealed prior to Raman spectroscopy. Raman spectra were recorded on an in Via Renishaw spectrometer using a liquid cooled Ge detector. Spectra were recorded in backscattering mode at room temperature (830 nm, 1% power, resolution 4 $cm^{-1}$).

At the studied concentrations, spectra indicated the presence of tri- and pentabromide species. To elucidate the relative proportions of these, raw spectra were treated by Gaussian peak fitting. The integrated areas of the peak-fitted signals for the symmetric stretches of tri- and pentabromide were then used to rate the ionic liquids in terms of polybromide forming efficiency (i.e., their preference towards the higher order polybromide).

(d) $^1H$ NMR Dimerisation Experiments:

Dimerisation experiments were conducted as per adapted literature methods (Weber, C. C., A. F. Masters, and T. Maschmeyer, *Controlling hydrolysis reaction rates with binary ionic liquid mixtures by tuning hydrogen-bonding interactions*. Journal of Physical Chemistry B, 2012. 116(6): p. 1858-186; Hunter, C. A., et al., *Substituent effects on cation-π interactions: A quantitative study*. Proceedings of the National Academy of Sciences of the United States of America, 2002. 99(8): p. 4873-4876). $CD_3CN$ was added to an NMR tube equipped with a Young's valve, with 0.1 M and 1 M solutions of the chosen ionic liquid (10% MeOD in $CD_3CN$) prepared independently. These stock solutions were added to the NMR tube sequentially prior to recording of the $^1H$ NMR spectrum. The chemical shift of the C2 proton of the ionic liquid at each concentration was recorded and fitted to the dimerisation isotherm generated previously by Weber, et al.

(e) Computational Details:

Standard DFT calculations were carried out with Gaussian 09 (Frisch, M. J., et al., Gaussian 09, Revision C. 01, ed. I. Gaussian. 2009, Wallingford Conn.). Geometries were obtained at the M05-2X/6-31G(d) level in conjunction with the SMD continuum solvation model (Zhao, Y., N. E. Schultz, and D. G. Truhlar, J. Chem. Theory Comput., 2006. 2: p. 364-382; Marenich, A. V., C. J. Cramer, and D. G. Truhlar, J. Phys. Chem. B 2009. 113: p. 6378-6396). The SMD model, when used in conjunction with the M05-2X/6-31G(d) method, has been shown to yield free energies of solvation with an overall mean absolute deviation of just 2.7 kJ $mol^{-1}$ for a diverse set of solutes in a wide range of non-aqueous solvents (Marenich et al.). The parameters for acetonitrile were used in conjunction with the SMD model in order to best reflect the experimental reaction conditions. The vibrational frequencies of stationary points were inspected to ensure that they corresponded to minima on the potential energy surface. Refined single-point energies were obtained with the MPW-B1K procedure with the 6-311+G (3df,2p) basis set (Zhao, Y. and D. G. Truhlar, J. Phys. Chem. A 2004. 108: p. 6908-6918). Scalar-relativistic effects are incorporated into the MPW-B1K calculations using the second-order Douglas-Kroll-Hess protocol. The D3BJ dispersion corrections were included in total electronic energies. In this preliminary investigation, it was find that this protocol yields binding energies of bromides that are in best agreement with benchmark values obtained with the high-level W1X-2 procedure (Grimme, S., et al., J. Chem. Phys., 2010. 132(154104): p. 1-19; Grimme, S., S. Ehrlich, and L. Goerigk, J. Comput. Chem, 2011. 32: p. 1456-1465; Chan, B. and L. Radom, J. Chem. Theory Comput., 2012. 8: p. 4259-4269). Zero-point vibrational energies and thermal corrections to enthalpy and entropies at 298 K, derived from scaled M05-2X/6-31G(d) frequencies, were incorporated into the total energies (Merrick, J. P., D. Moran, and L. Radom, J. Phys. Chem. A, 2007. 111: p. 11683-11700). The total MPW-B1K free energies also include the effect of solvation using the SMD model and parameters derived for acetonitrile. All relative energies are reported as solvation-corrected 298 K free energies in kJ $mol^{-1}$.

Figure 3:
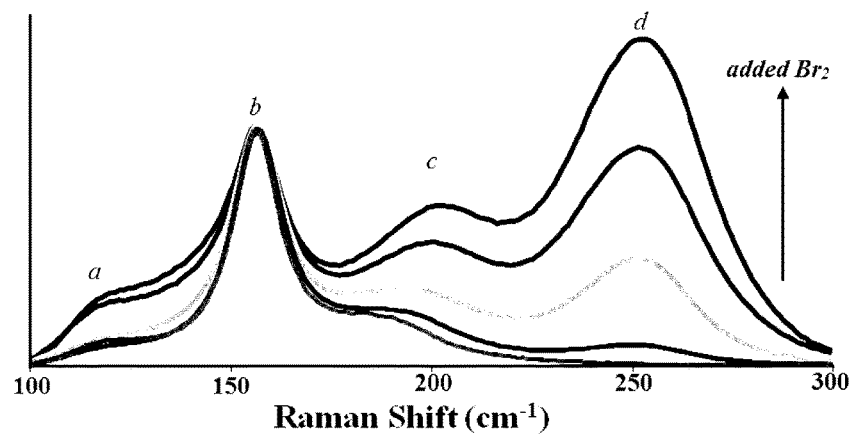
FIG. 3 provides Raman spectral data for $C_2MPyrBr$ in 10% MeOH:MeCN with added $Br_2$. Labelled features: a) signal from background, b) symmetric tribromide stretch (160 cm$^{-1}$), c) overlapping asymmetric stretch from $Br_3^-$ (197 cm$^{-1}$) and $Br_5^-$ (208 cm$^{-1}$), d) symmetric pentabromide stretch (256 cm$^{-1}$).

Results and Discussion:

Ionic liquid solutions progressed from a light orange to deep red with sequential additions of bromine. Raman spectroscopy of these solutions revealed a pure tribromide species at the 0.8:1 $Br_2$:IL ratio as signified by the strong symmetric stretch at 160 $cm^{-1}$ and the broad asymmetric stretch at 197 $cm^{-1}$ (literature, 163 and 198 $cm^{-1}$; Chen, X., et al., *Raman Spectroscopic Investigation of Tetraethylammonium Polybromides*. Inorganic Chemistry, 2010. 49(19): p. 8684-8689) With subsequent additions of bromine, the growth of a pentabromide species (signified by the broad asymmetric stretch at 208 $cm^{-1}$ and the sharp symmetric stretch at 256 $cm^{-1}$: literature; 210 and 253 $cm^{-1}$; Chen et al.) was observed eventually for all ionic liquids. An example Raman spectrum for the [C$_2$MPyr]Br$_n$ system is shown in FIG. 3, with peak heights normalised to the tribromide symmetric peak in order to demonstrate the growth of the pentabromide anion with increasing bromine concentration. The ratio of Br$_5^-$/Br$_3^-$ defines the 'Polybromide Forming Efficiency' and was used to construct FIGS. 4 (a)-(c).

Figure 4A:
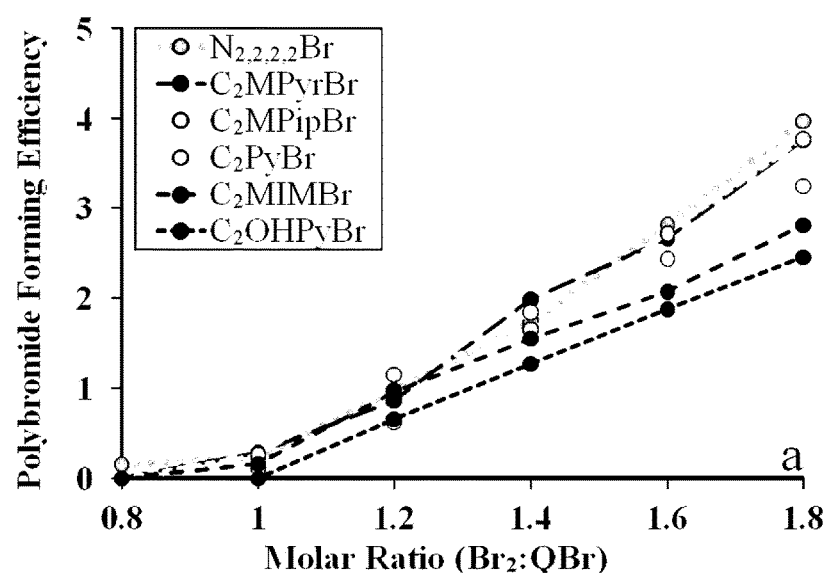
FIG. 4 illustrates the efficiency of polybromide formation (ratio of $Br_5^-$:$Br_3^-$ symmetric Raman stretches) by varying ionic liquid cations with increasing additions of bromine; (a) ethyl-substituted cations, (b) butyl-substituted, (c) hexyl or octyl substituted. Dashed lines are a visual guide only.
Figure 4B:
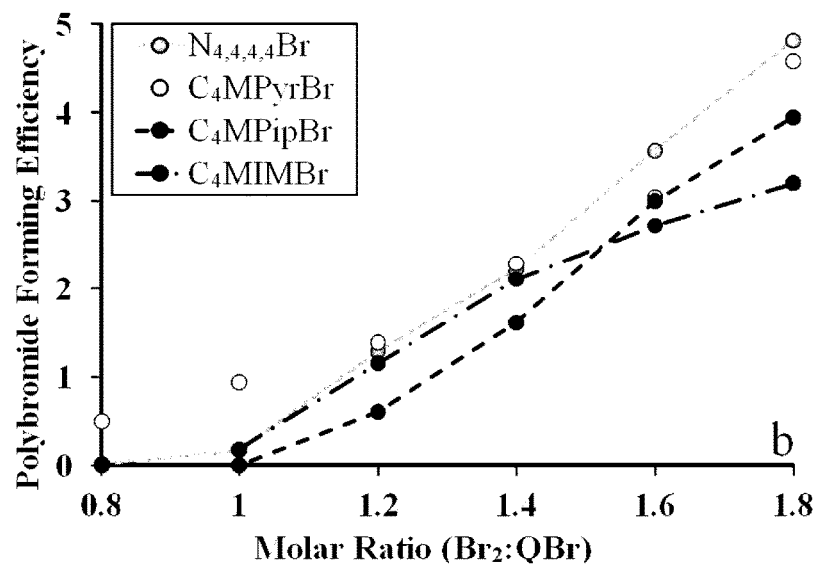
Figure 4C:
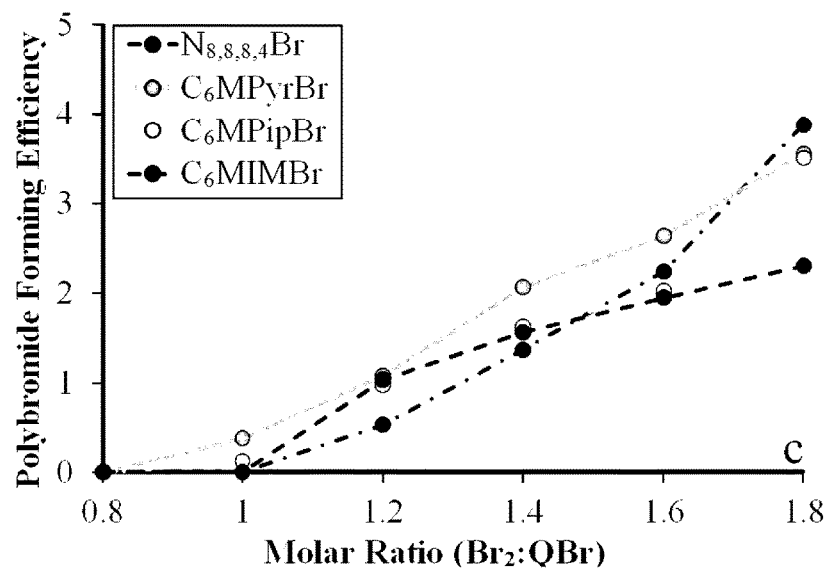

FIGS. 4 (a)-(c) show the selectivity for the higher bromide species as a function of the concentration of Bri. For the ionic liquid species studied, the aromatic analogues [C$_2$MIM]Br and [C$_2$Py]Br were the most poorly performing cations, while the tetraalkylammonium and butyl-substituted pyrrolidinium and pyridinium were the best performing cations. Of moderate performance were the long (C$_6$) and short (C$_2$) chain pyrrolidinium and pyridinium cations which all gave numerical values that were remarkably alike.

Figure 5A:
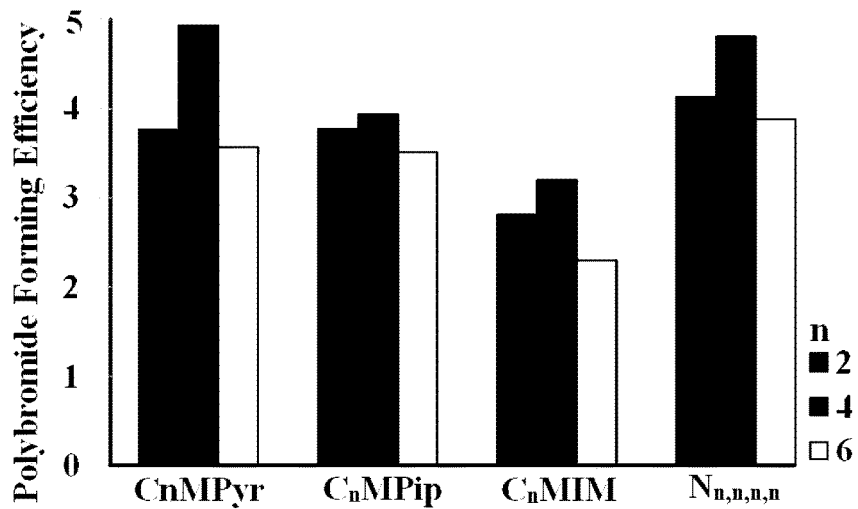
FIG. 5 shows (a) studied cations ordered towards their preference towards the formation of the higher polybromide; and (b) influence of the IL cation's alkyl-chain length on polybromide forming efficiency.
Figure 5B:
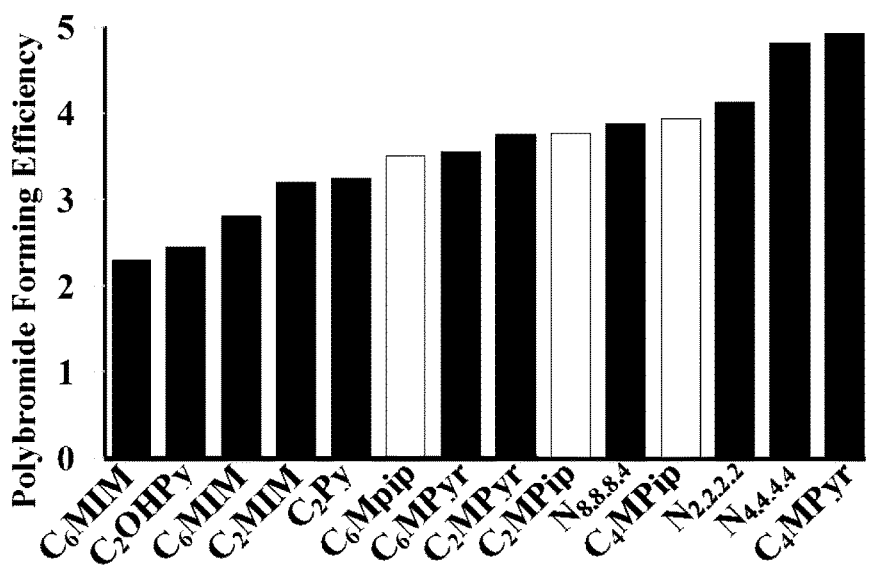

In order to determine the efficacy of the polybromide formation in various ILs, the ratio of the symmetric Br$_5^-$ to the symmetric Br$_3^-$ stretches in the Raman spectra was determined, with the rationale being that the better an IL was at forming and stabilising the higher order polybromide, the more efficient its action as a sequestering agent. The absorption bands of even higher order polybromides (Br$_7^-$, Br$_9^-$, etc) appear at wavenumbers so close to each other that it is difficult to obtain clear ratios of each, and thus other ratios were not determined. From FIG. 5 (a), it is clear that certain cation species have an enhanced ability to form polybromide species. For example, the cations [C$_4$MPyr]$^+$ and [N$_{4444}$]$^+$ have the greatest ability of the cations studied to form and stabilise higher order polybromide species in solution, closely followed by the cations [N$_{2222}$]$^+$, [C$_4$MPip]$^+$, [N$_{8884}$]$^+$, [C$_2$MPip]$^+$, and [C$_2$Mpyr]$^+$. Grouping the various cation types together allows information on the influence of the length of the alkyl chain on the polybromide to obtained (FIG. 5 (b)). In every case, the longest chain derivative performed most poorly, with the butyl derivative the best performing and the ethyl analogue of intermediate performance.

These observations allow the conclusion that cations with less diffuse charges and moderate length of substituted alkyl chains preferentially form higher order polybromide species. It is hypothesised that these observations stemmed from a combination of the relative strength of cation-anion interactions and ion pair self-assembly in solution. These hypotheses were examined by DFT calculations of ionic binding energy, and $^1$H NMR dimerisation experiments respectively.

Figure 6:
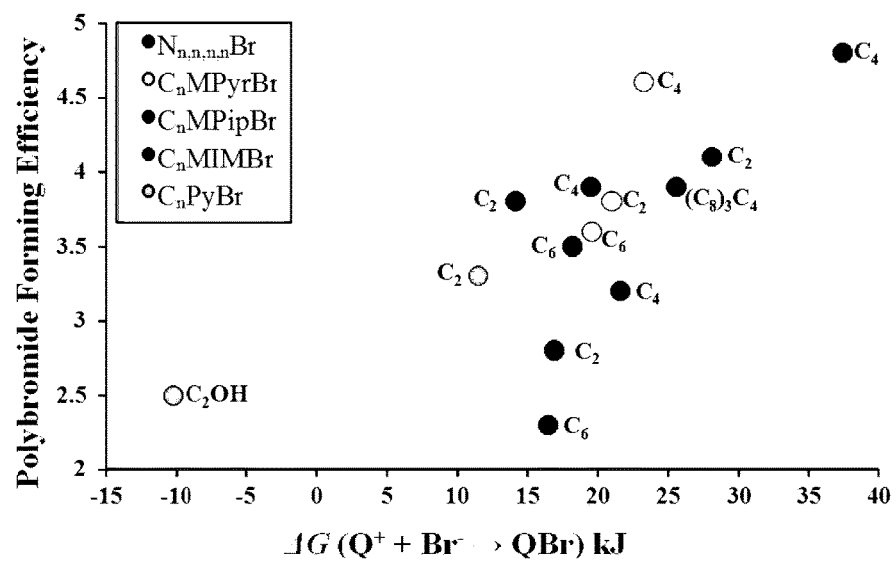
FIG. 6 demonstrates observed trends for bromine sequestration performance with ionic binding energies.

DFT calculations were performed to quantitate the strength of Q-Br ion pair interactions, which were used here as a proxy to the polybromide forming efficiency. The calculated binding energy forms a reasonable correlation with the experimentally observed efficiency. The condensed phase MPW-B1K free energies of binding are listed in Table 1 and a plot of these values against the polybromide forming efficiency is shown in FIG. 6. The ILs that preferenced the higher order polybromide were generally seen to be those that exhibited more positive free energy of binding (FIG. 6), that is, more weakly associated ion pairs.

This trend is ascribed to the 'availability' of the bromide anion. Ion pairs with more positive binding energies are more weakly associated ion pairs, and less electronic influence of the cation over the bromide anion can therefore be expected. This allows the bromide ion to donate greater influence from its HOMO to the LUMO of the entering bromine molecules without the competition present in the ion pairing process. Diffuse charges, such as that of the pyridinium and imidazolium cations, are undesirable as they 'consume' the charge of the bromide anion, making it less available for bromine molecules to be sequestered by the bromide salt. Conversely, positive point charges were calculated to be more weakly associating, and in turn elicit less influence on the bromide anion, effectively freeing it up for polybromide formation.

The trend of binding energy with performance was generally reasonable, but the calculations do not fully account for the relatively lower performance of [C6MIM]Br and [C$_6$MPip]Br in particular. Their behaviour was thus attributed to other structural effects. It is proposed that this is associated with the self-assembly of the IL ion pairs in solution.

Figure 7:
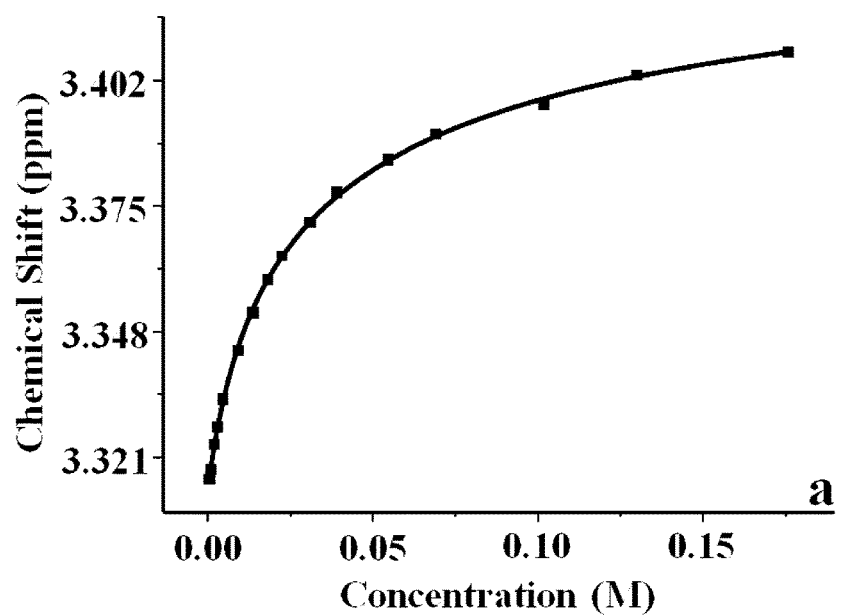
FIG. 7 shows the chemical shift of the C2 proton of $C_2MPyrBr$ as a function of concentration in 10% MeOD: $CD_3CN$.

In order to explain the "off-trend" behaviours of [C$_6$MIM]Br and [C$_6$MPip]Br, a series of $^1$H NMR dilution experiments were performed to follow the dimerisation of IL ion pairs, and thus quantitate their degree of self-assembly in solution. The $^1$H chemical shifts for the respective C2 protons of the cations were recorded and plotted against species concentration before fitting to a dimerisation isotherm (an example is shown in FIG. 7). This procedure allowed the dimerisation association constant (K$_a$), Gibbs free energy values ($\Delta G_d$) and the limiting chemical shifts of the ion pair and dimer ($\delta_{ip}$ and $\delta_d$) to be determined (Table 1).

TABLE 1

Summary of Binding Energy Calculations and $^1$H NMR Titration Data (at 300K in MeOD:CD$_3$CN (1:10)).

| Compound | $\Delta G_{B.E.}$ (kJ mol$^{-1}$) | K$_a$ | $\Delta G_{dim}$ (kJ mol$^{-1}$) | $\Delta \delta_{2H}$ (ppm$^{-1}$) |
|---|---|---|---|---|
| [N$_{2,2,2,2}$]Br | 28.1 | 4.70 ± 0.20 | −3.86 | 0.07 |
| [N$_{4,4,4,4}$]Br | 37.4 | 9.71 ± 0.46 | −5.67 | 0.09 |
| [N$_{8,8,8,4}$]Br | 25.6 | 15.5 ± 0.91 | −6.84 | 0.08 |
| [C$_2$MPyr]Br | 21.0 | 20.6 ± 0.72 | −7.54 | 0.14 |
| [C$_4$MPyr]Br | 23.3 | 8.53 ± 1.3 | −5.35 | 0.21 |
| [C$_6$MPyr]Br | 19.6 | 27.1 ± 7.6 | −8.23 | 0.18 |
| [C$_2$MPip]Br | 14.2 | 20.8 ± 1.1 | −7.57 | 0.14 |
| [C$_4$MPip]Br | 19.5 | 21.0 ± 2.3 | −7.59 | 0.17 |
| [C$_6$MPip]Br | 18.2 | 14.26 ± 1.8 | — | — |
| [C$_2$MIM]Br | 16.9 | 29.9 ± 2.32 | — | — |
| [C$_4$MIM]Br | 21.6 | — | — | — |
| [C$_6$MIM]Br | 16.5 | 24.3 ± 3.1 | — | — |
| [C$_2$Py]Br | 11.5 | 28.6 ± 1.0 | −8.36 | 0.14 |
| [C$_2$OHPy]Br | −10.2 | 172 ± 24 | −12.8 | 1.46 |

The results in Table 1 demonstrate a high propensity for dimerisation of cations with aromatic groups or long-alkyl chains, which is consistent with the previously proposed influence of π-interactions between monomers, or the increased influence of intermolecular hydrophobic interactions, respectively. The trend for ease of dimerisation is inversely proportional to the polybromide forming efficiency, demonstrating that freely dissociated ion pairs are more likely to build higher-order polybromide species. Thus, where the binding energy influence does not fully explain the compound's performance as a BSA, their strength of dimerisation may also be a significant factor. This can be ascribed to a reduced steric availability of the bromide anion in highly associated ionic liquids, which limits entering bromine molecules from sequestration by bromide anions.

In contrast, in the case of the alkylammonium bromide salts, the dimerization energies decreased with increasing chain-length, which does not directly correspond with the aforementioned bromine sequestration behaviour of the order of tetrabutyl>tetraethyl>trioctylbutyl. While dimerization behaviour does have some influence over the bromine sequestration properties of ionic liquids, this experimental observation suggests that the binding energy of the ion-pair is likely to be the more dominant influence over the cation's bromine sequestration behaviour, in particular for the alkylammonium cations.

Example 2: Synthesis of Ionogels Using Polymer Gelation Agents

General Considerations:

The following chemicals were used as received: poly (ethylene oxide) ($M_n$ 1000000; PEO), poly(vinylidene fluoride-co-hexafluoropropylene) (av. $M_W$ ~455000, PVdF-HPF), zinc bromide dehydrate, zinc nitrate hexahydrate, bromine.

The following ionic liquids (ILs) were prepared using standard literature methods: N-octylpyridinium bromide ([$C_8$Py]Br), N-octylpyridinium bis(trifluoromethanesulfonyl)imide ([$C_8$Py]NTf$_2$), octyltributylphosphonium bromide ([$P_{8,4,4,4}$]Br), tetrabutylphosphonium bromide ([$P_{4,4,4,4}$]Br), 1-butyl-3-methylimidazolium bromide ([BMIM]Br), 1-butyl-3-methylimidazolium bis(trifluoromethanesulfonyl)imide ([BMIM]NTf2), 1-butyl-2,3-dimethylimidazolium bromide ([BDMIM]Br), 1-butyl-2,3-dimethylimidazolium bis(trifluoromethanesulfonyl)imide ([BDMIM]NTf$_2$).

General Method:

To a solution of the ionic liquid (500 mg) in acetone (4 mL) was added the desired polymer (50 mg (10 wt. %) or 100 mg (20 wt. %)). The resultant suspension was heated at 60° C. with constant agitation until the solution was homogeneous. The resultant solution was then decanted into a suitable mould and then placed on a heated surface (~50° C.) to allow the acetone to slowly evaporate over a the course of a couple of hours. The resultant ionogel was then carefully removed from the mould by means of forceps.

Gelation of [$C_8$Py]NTf$_2$ with 20 wt. % poly(ethylene oxide) (PEO):

The resultant ionogel was obtained as an optically clear gel and very sticky to the touch, and turned out to be an extremely viscous liquid, not a self-supporting membrane.

Gelation of [P8444]Br with 20 wt. % PEO:

The resultant ionogel was obtained as a white opaque gel with good elastic strength. When 10 wt. % of polymer was used there was insufficient polymer to fully sequester the IL.

Gelation of octyltributylphosphonium phosphonium bromide with PEO:

To a solution of poly(ethylene oxide) ($M_n$ 1000000) (100 mg) in ethyl acetate (10 mL), which had been heated at 60° C. in order to facilitate dissolution of the polymer, was added octyltributylphosphonium bromide (500 mg) in ethyl acetate (5 mL). The resultant solution was heated at 60° C. with constant agitation until the solution was completely homogeneous. After this time, the solvent was removed by passing a stream of dry nitrogen over it. The resultant material is a white viscoelastic material.

Gelation of [$C_8$Py]NTf$_2$ with 10 wt. % poly(vinylidene fluoride-co-hexafluoropropylene) (PVdF-HFP):

The resultant ionogel was slightly cloudy with low strength, but still a self-supporting membrane.

Gelation of [$C_8$Py]NTf$_2$ with 20 wt. % PVdF-HFP:

The resultant ionogel was slightly cloudy with good strength.

Gelation of [BMIM]NTf$_2$ with 20 wt. % PVdF-HFP:

The resultant ionogel was slightly cloudy with good strength.

Gelation of [BDMIM]NTf$_2$ with 20 wt. % PVdF-HFP:

The resultant ionogel was slightly cloudy with good strength.

Gelation of [$C_8$Py]Br with 20 wt. % PVdF-HFP:

The resultant ionogel was cloudy and opaque with good strength.

Gelation of [$P_{8,4,4,4}$]Br with 20 wt. %. PVdF-HFP:

The resultant ionogel was slightly cloudy with good strength.

Gelation of [$P_{4,4,4,4}$]Br with 20 wt. % PVdF-HFP:

The resultant ionogel was slightly cloudy with what appeared to be crystallised ionic liquid on the surfaces (the IL is a solid at room temperature). This gel was deliquescent and beads of water appeared on the surface when standing at room temperature.

Gelation of [BMIM]Br with 20 wt. % PVdF-HFP:

The resultant ionogel was cloudy and opaque with good strength.

Example 3: Incorporation of $Zn^{2+}$ into Gels

General Method:

To a solution of the ionic liquid (500 mg) in acetone (4 mL) was added the desired polymer (50 mg (10 wt. %) or 100 mg (20 wt. %)) and the zinc salt ($ZnBr_2$ or $Zn(NO_3)_2$). The resultant suspension was heated at 60° C. with constant agitation until the solution was homogeneous. The resultant solution was then decanted into a suitable mould and then placed on a heated surface (~50° C.) to allow the acetone to slowly evaporate over a the course of a couple of hours. The resultant ionogel was then carefully removed from the mould by means of forceps.

Gelation of [C8Py]NTf$_2$ with 10 wt. % PEO and 5 wt. % $ZnBr_2$:

Obtained a clear highly viscous material. No gel formation observed.

Gelation of [C8Py]NTf$_2$ with 10 wt. % PVdF-HFP and 5 wt. % $ZnBr_2$:

Obtained a cloudy ionogel with little strength.

Gelation of [C8Py]NTf$_2$ with 10 wt. % PEO and 5 wt. % $Zn(NO_3)_2$:

Obtained a clear highly viscous material. No gel formation observed.

Gelation of [C8Py]NTf$_2$ with 10 wt. % PVdF-HFP and 5 wt. % $Zn(NO_3)_2$:

A slightly cloudy gel is obtained with similar strength to that obtained when using $ZnBr_2$.

Gelation of [C8Py]NTf$_2$ with 10 wt. % PEO and 10 wt. % $Zn(NO_3)_2$:

A cloudy gel is obtained which, when being removed, reveals that much of the IL sits below the plastic layer and has not been incorporated.

Gelation of [C8Py]NTf$_2$ with 10 wt. % PVdF-HFP and 10 wt. % $Zn(NO_3)_2$:

A slightly cloudy gel is obtained which appears to be more fragile than that obtained when using 5 wt. % of the zinc salts.

Example 4: Treatment of Bromine Sequestering Ionogels with $Br_2$

General Method:

To the respective ionogels (in petri dishes) was added a hexane solution of $Br_2$ (17 mL in 2 mL hexane, 10 wt. %). The petri dish was covered with a watch glass to prevent evaporation and the solution allowed to stand for ~5 min before it was removed. The resultant ionogels were now a bright orange colour and the hexane solutions were colourless. A small portion of the ionogel was then removed for characterization by Raman spectroscopy. This process was repeated up to 3 times for the following gels: [P8,4,4,4]Br/20 wt. % PVdF-HFP, [P4,4,4,4]Br/20 wt. % PVdF-HFP, [C8Py]Br/20 wt. % PVdf-HFP, and [BMIM]Br/20 wt. % PVdF-HFP.

In the case of the [$C_8Py$]Br/20 wt. % PVdf-HFP gel a large amount of the IL/polybromide separates from the polymer network. This is significantly less pronounced for the [$P_{8,4,4,4}$]Br/20 wt. % PVdF-HFP system. The [BMIM]Br/20 wt. % PVdF-HFP system showed no IL separation from the polymer network. For the [$P_{4,4,4,4}$]Br/20 wt. % PVdF-HFP after 10 wt. % $Br_2$ was added, it appears as though the IL has been displaced form the gel network and crystallised on the surface of the gel.

Raman spectroscopy of all of the gels after $Br_2$ addition (up to 30 wt. %) showed the exclusive formation of only [$Br_3$]$^-$. No higher order polybromide species were observed. This is currently believed to be the result of the nanoconfinement of the IL preventing adequate $Br_2$ from diffusing into the pores and, when this occurs, the size of the pore may then too small to allow the formation of higher order polybromide species.

Example 5: Assembly of Gelated IL Films on Carbon Paper Electrodes

Figure 8:
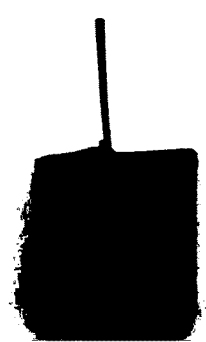
FIG. 8 shows a 'zinc-side' electrode comprising $[C_8Py]NTf_2$ ionic liquid gelated with 20 wt. % PVdF-HFP with 10 wt. % dissolved $Zn(NO_3)_2 \cdot 6H_2O$ as a zinc source on a carbon paper electrode with a geometric surface area of 4 $cm^2$, attached to a potentiostat by silver wire.
Figure 9:
FIG. 9 shows a 'bromide-side' electrode comprising a $[P_{8,4,4,4}]Br$ ionic liquid gelated with 20 wt % PVdF-HFP containing dissolved 8.8 wt % $ZnBr_2$ as a bromine source on a carbon paper electrode with a geometric surface area of 4 $cm^2$, attached to a potentiostat by silver wire.

A prototype zinc bromide ionogel battery was assembled from a 'zinc side' electrode and a 'bromine side' electrode. The 'zinc side' electrode consisted of a [$C_8Py$]$NTf_2$ ionic liquid, gelated with 20 wt % PVdF-HFP with 10 wt % dissolved $Zn(NO_3)_2$ as a zinc source (see FIG. 8). The 'bromide side' electrode consisted of a [$P_{8,4,4,4}$]Br ionic liquid gelated with 20 wt % PVdF-HFP containing dissolved 8.8 wt % $ZnBr_2$ as a bromine source (see FIG. 9). The gels were formed around a carbon paper electrode with a geometric surface area of 4 $cm^2$, attached to the potentiostat by silver wire.

A test cell of two ionogel electrodes was tested by cyclic voltammetry and constant potential electrolysis (CPE) to simulate a charge and discharge cycle.

Example 6: Cyclic Voltammetry (CV) of Assembly in Example 5

Figure 10:
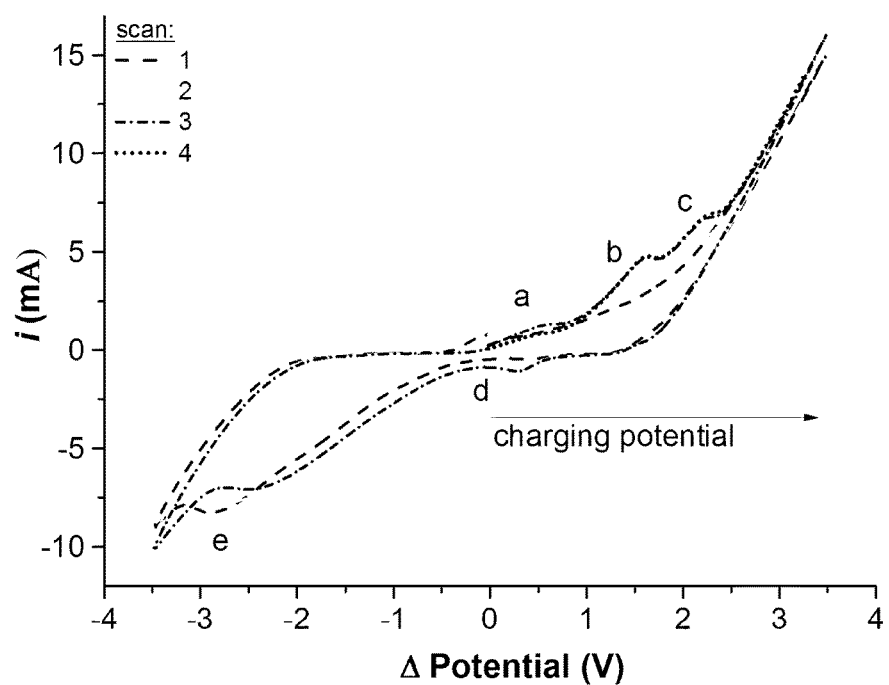
FIG. 10 shows the results of a four scan two-electrode cyclic voltammetry (CV) experiment, with the bromine-side electrode in FIG. 9 set as the working electrode and the zinc-side electrode in FIG. 8 as the counter and pseudo-reference electrode.

In order to find the potential range to be used in a model charging step, a two-electrode CV was set up, with the bromine side as described in Example 5 set as the working electrode and the zinc side as described in Example 5 as the counter and pseudo-reference electrode. The results for a four scan CV experiment are shown in FIG. 10. It is important to note that positive current does not represent an oxidative process, but a 'redox' process. With this set-up, inputting positive potential 'charges' the battery, so that all events seen in the positive range could be either oxidative or reductive. The potential on the horizontal axis is thus a relative potential between each half-cell.

On the first scan (FIG. 10, black dashed line) only very small redox processes can be seen in the positive direction. In the negative direction, a large signal at −3 V (e) can be seen. This is a result of a strongly sequestering species formed from the charging step. On the second scan (FIG. 10, grey solid line) three distinct peaks (a, b and c) are observed in the 'charging' phase. These are currently attributed to zinc deposition and two different bromide oxidation steps which may result from an ECE mechanism (bromide and tribromide oxidation) or from oxidation of the $ZnBr_2$ and the bromide ionic liquid. On the return sweep, another signal (d) is seen, and is likely coupled to the redox process, a.

For the third and fourth sweeps (FIG. 10, black dot-dashed line and FIG. 10 black dotted line, respectively), the peak current of process a is decreased, while that of b and c are increased. Further tests are required to confirm the sources of these signals.

Example 7: Battery Charge/Discharge of Assembly in Example 5 by Constant Potential Electrolysis (CPE)

Figure 11:
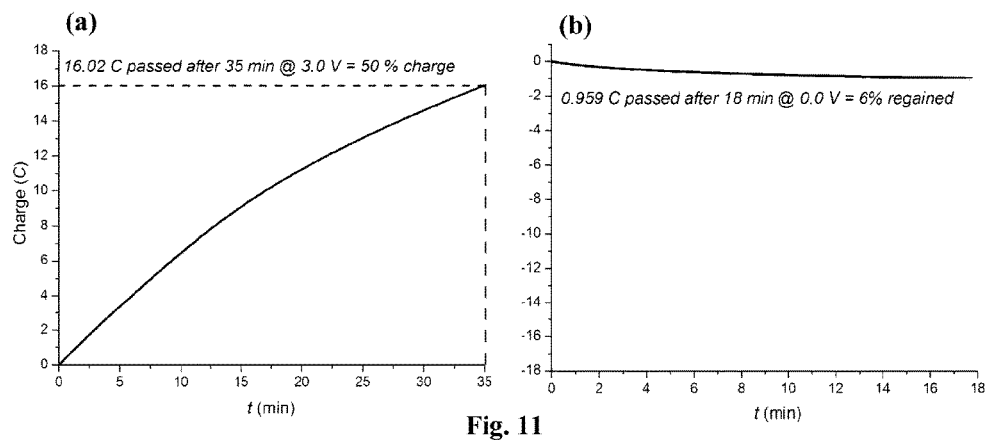
FIG. 11 shows the charge/time plots for the test cell used in FIG. 10, and demonstrates that a 50% charge (equivalent to 16 C) was achieved after 35 minutes (left). It also shows a model discharge curve achieved by setting a potential of 0 V across the test battery (right), demonstrating that less than 1 C passed after 18 minutes of 'discharge' time, roughly equivalent to a 6% return of electroactive species.

Charge/time plots for the test cell described in Example 5 are shown in FIG. 11. For the charging phase, a potential of +3.0 V was applied as determined from the CVs in the Example 6. For complete consumption of the zinc nitrate dissolved in the ionogel, it was calculated that 32 C would have to pass. Thus, a 50% charge (equivalent to 16 C) was achieved after 35 minutes (see left plot, FIG. 11) The right plot in FIG. 11 shows a model discharge curve achieved by setting a potential of 0 V across the test battery. The current passed in this step was minimal, with less than 1 C passed after 18 minutes of 'discharge' time, roughly equivalent to a 6% return of electroactive species.

Figure 12:
FIG. 12 shows a 'zinc-side' electrode comprising $[C_8Py]NTf_2$ ionic liquid gelated with 20 wt. % PVdF-HFP with 10 wt. % dissolved $Zn(NO_3)_2 \cdot 6H_2O$ as a zinc source on a carbon paper electrode with a geometric surface area of 4 $cm^2$, attached to a potentiostat by silver wire, after the 50% charge shown in FIG. 11.
Figure 13:
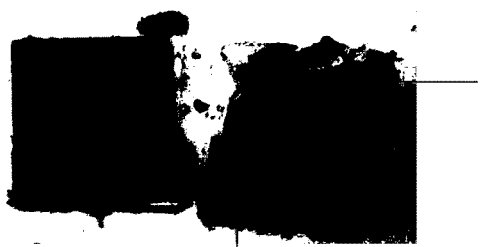
FIG. 13 shows a 'bromide-side' electrode comprising a $[P_{8,4,4,4}]Br$ ionic liquid gelated with 20 wt % PVdF-HFP containing dissolved 8.8 wt % $ZnBr_2$ as a bromine source on a carbon paper electrode with a geometric surface area of 4 $cm^2$, attached to a potentiostat by silver wire, after the 50% charge shown in FIG. 11.

The electrodes after charge are pictured in FIG. 12 ('zinc side' electrode) and FIG. 13 ('bromine side' electrode), demonstrating the generation of a significant amount of bromine/polybromide (shading in FIG. 13; see arrows) confirming sequestration of a polybromide species in the ionic liquid gel layer.

Example 8: Assembly of Gelated IL Films on Titanium Mesh Electrodes and Battery Formed from Same In this example, the following chemicals were used: Poly(vinylidene difluoride-hexafluoropropylene) (PVdF-HFP) (Aldrich, $M_W$~455000), zinc triflate (Aldrich), lithium bromide (Aldrich), bromine (Panreac), 1-methyl-3-octylimidazolium bromide ([OMIM]Br), and 1-methyl-3-octylimidazolium bis(trifluoromethanesulfonyl)imide ([OMIM]$NTf_2$). Titanium mesh electrodes were purchased form NMT Electrodes (Perth, Australia) and were cleaned using 6 M $HNO_3$ and distilled water prior to use.

Figure 14:
FIG. 14 shows two half-cell electrodes (the 'bromine electrode' and the 'zinc electrode'), each comprising a gelated ionic liquid gel (comprising $[OMIM]NTf_2$ and [OMIM]Br in PVdF-HFP solution as described in Example 8) in contact with a titanium mesh electrode, encased in a Teflon® die designed and manufactured at the University of Sydney.
Figure 15:
FIG. 15 shows the two half-cells in FIG. 14 pushed together such that the ionic liquid gel in one half cell is in contact with the ionic liquid gel of the other half cell. The two half cells are sealed together and connected to an external circuit, allowing for electrochemical analysis using an eDAQ potentiostat.
Figure 16:
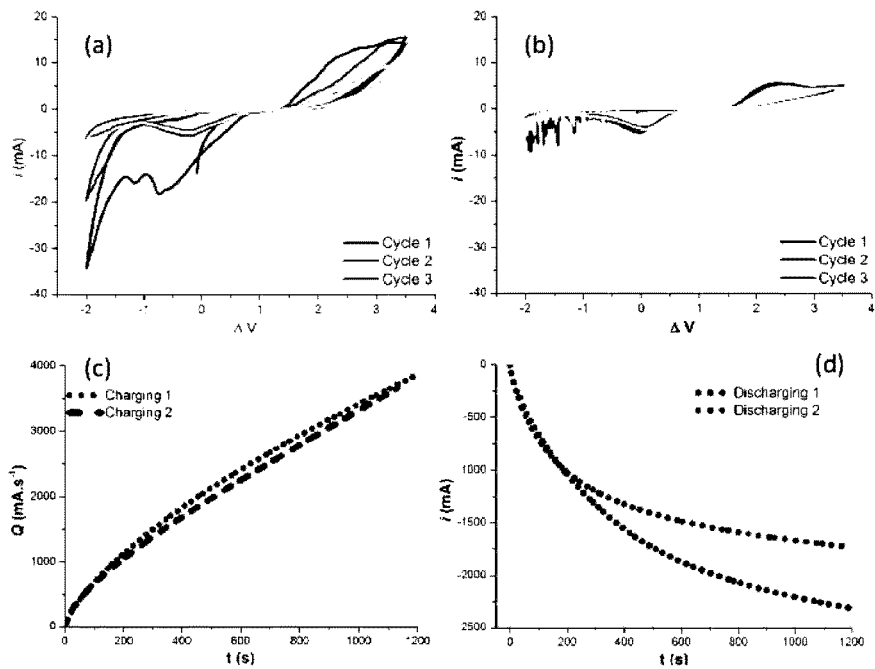
FIG. 16 shows (a) Pre-cycling voltammograms, (b) post-cycling voltammograms, (c) 20 min charge cycles, and (d) 20 min discharge cycles for Cell 1 in Table 2.
Figure 17:
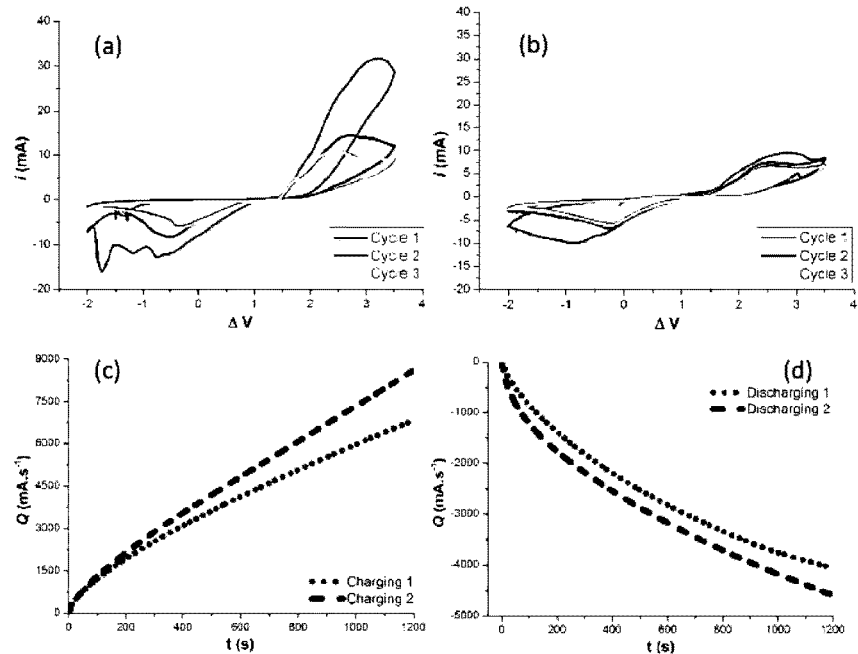
FIG. 17 shows (a) Pre-cycling voltammograms, (b) post-cycling voltammograms, (c) 20 min charge cycles, and (d) 20 min discharge cycles for Cell 2 in Table 2.
Figure 18:
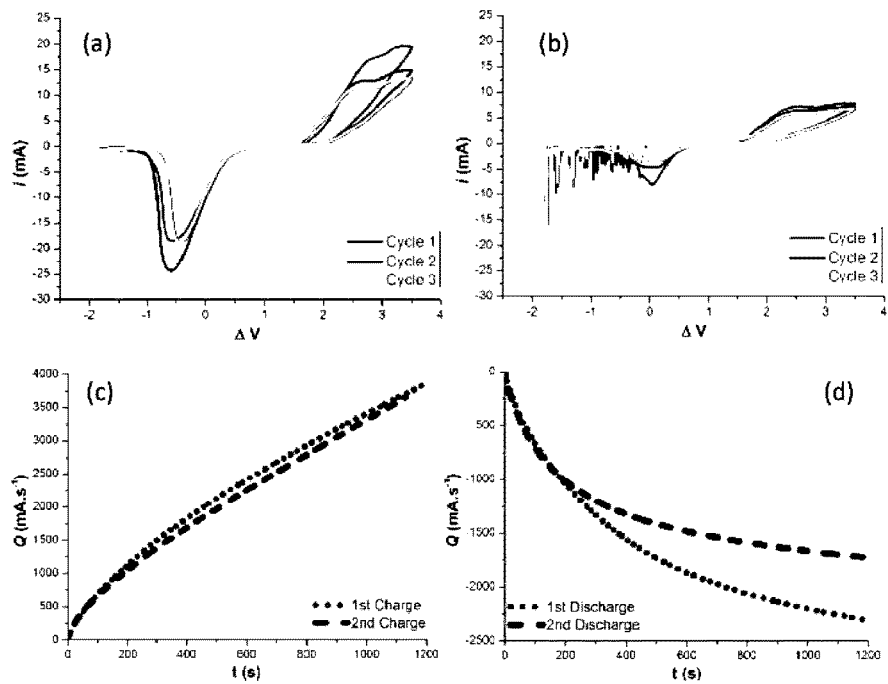
FIG. 18 shows (a) Pre-cycling voltammograms, (b) post-cycling voltammograms, (c) 20 min charge cycles, and (d) 20 min discharge cycles for Cell 3 in Table 2.
Figure 19:
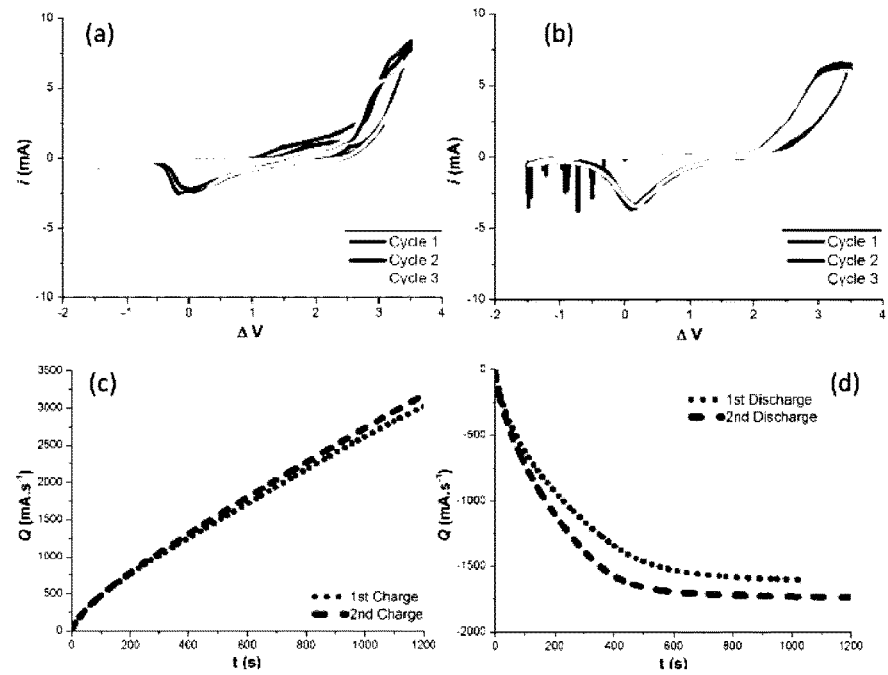
FIG. 19 shows (a) Pre-cycling voltammograms, (b) post-cycling voltammograms, (c) 20 min charge cycles, and (d) 20 min discharge cycles for Cell 4 in Table 2.
Figure 20:
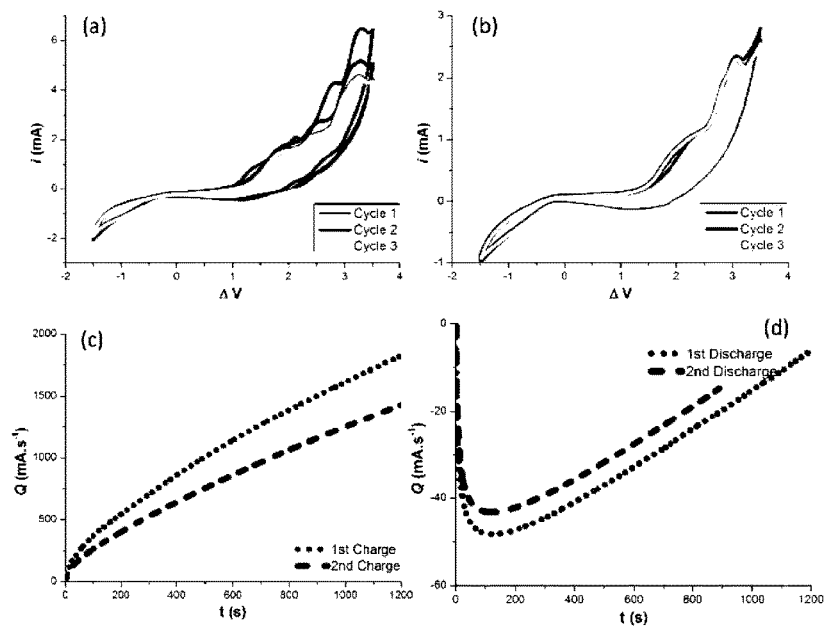
FIG. 20 shows (a) Pre-cycling voltammograms, (b) post-cycling voltammograms, (c) 20 min charge cycles, and (d) 20 min discharge cycles for Cell 5 in Table 2.
Figure 21:
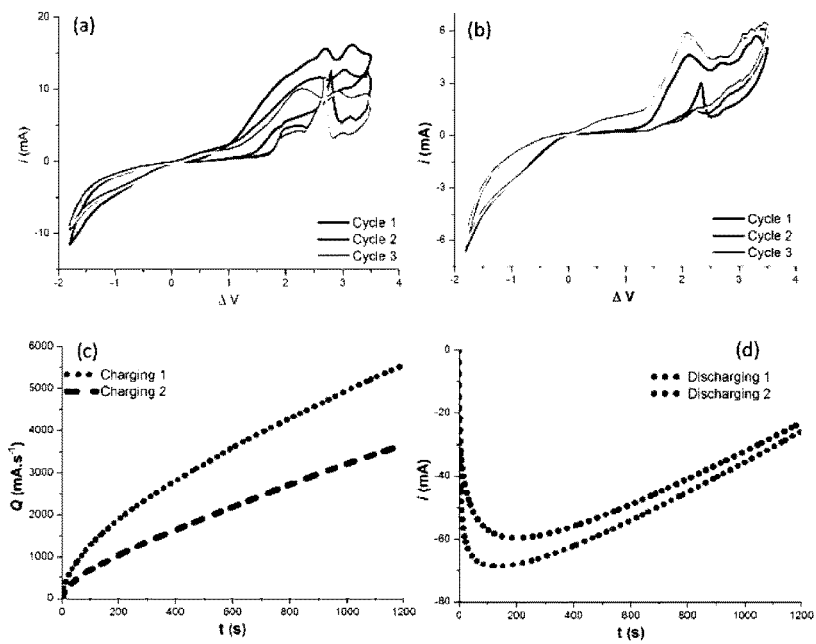
FIG. 21 shows (a) Pre-cycling voltammograms, (b) post-cycling voltammograms, (c) 20 min charge cycles, and (d) 20 min discharge cycles for Cell 6 in Table 2.

Teflon® dies were designed and manufactured at the University of Sydney. These dies were designed such that each half-cell, comprising a gelated ionic liquid gel in contact with a titanium mesh electrode, could be prepared separately (see FIG. 14). When the gel had 'cured', the half-cells could then be pushed together and sealed to allow for electrochemical analysis using an eDAQ potentiostat (see FIG. 15). The half-cells are described in this example as either a 'zinc electrode' (i.e., the electrode at which zinc ions are reduced during charge or zinc is oxidised during discharge) or a 'bromine electrode' (i.e., the electrode at which bromide ions are oxidised during charge or bromine is reduced during discharge).

Table 2 shows the composition of the iongels used to prepare the batteries in this example for testing. The ionogels containing 10 wt. % polymer gelation agent were prepared according to the following method:

Poly(vinylidene difluoride-hexafluoropropylene) (PVdF-HFP) (150 mg) was swelled in $CH_3CN$ (7 mL) at 65° C. until a clear homogeneous solution was obtained. For the iongel to be used on the zinc electrode, the PVdF-HFP solution was added to a mixture of the ionic liquid [OMIM]$NTf_2$ (1.5 g) and $Zn(OTf)_2$ (150 mg, 10 wt. % based on the IL) in acetonitrile and the mixture was then heated at 65° C. with constant agitation until the solution was homogeneous. For the iongel to be used on bromide electrode, the PVdF-HFP solution was added to a 50:50 mixture of the ionic liquids [OMIM]NTf$_2$ (0.75 g) and [OMIM]Br (0.75 g) and LiBr (71 mg, 4.7 wt. % based on the IL, 2 molar equivalents based on Zn(OTf)$_2$) in acetonitrile and this was then heated at 65° C. with constant agitation until the solution was homogeneous. In both cases, the acetonitrile was removed until the volume of the solution was ~3 mL. The resultant solutions were then poured into their respective dies containing a Ti mesh electrode. The gels were then allowed to set and excess solvent evaporated at ambient temperature (22-25° C.) for 2 h. After this time, the two battery half-cells were pushed together such that the surface of the gel on the zinc electrode was substantially completely in contact with the surface of the gel on the bromine electrode and the pushed together cells were secured in place for testing. The thickness of the gel layer on each titanium mesh electrode was approximately 3-5 mm. Using this protocol, the distance between the electrodes was thus 6-10 mm.

In the case where Br$_2$ was added to the bromide electrode ionogel, 0.1 equivalents (based on total Br concentration) was used. This Br$_2$ was added after removal of the CH$_3$CN to ~3 mL. In the case of any inhomogeneities formed in the gel after adding the Br$_2$, the solution was reheated to 65° C. to re-swell the polymer.

The electrochemical testing regimen involved the acquisition of 3 cyclic voltammograms prior to charging, 2 charging-discharging cycles (20 min for each cycle) and, finally, 3 cyclic voltammograms. The results of electrochemical testing are given in Table 3 below for each of Cells 1-6 as described in Table 2 and in FIGS. 16 to 21.

TABLE 2

Composition of the ionogels used for various Zn—Br battery test cells.

| Cell | Zn Electrode Iongel | Zn Source | Br Electrode Ionogel | Bromide Source | Br Electrode Ionogel Additive |
|---|---|---|---|---|---|
| 1 | [OMIM]NTf$_2$ + 10 wt. % PVdF-HFP | 10 wt. % Zn(OTf)$_2$ | 50:50 [OMIM]NTf$_2$: [OMIM]Br + 10 wt. % PVdF-HFP | — | — |
| 2 | [OMIM]NTf$_2$ + 10 wt. % PVdF-HFP | 10 wt. % Zn(OTf)$_2$ | 50:50 [OMIM]NTf$_2$: [OMIM]Br + 10 wt. % PVdF-HFP | 4.7 wt. % LiBr | — |
| 3 | [OMIM]NTf$_2$ + 10 wt. % PVdF-HFP | 10 wt. % Zn(OTf)$_2$ | 50:50 [OMIM]NTf$_2$: [OMIM]Br + 10 wt. % PVdF-HFP | 4.7 wt. % LiBr | 3.8 wt. % Br$_2$ |
| 4 | [OMIM]NTf$_2$ + 20 wt. % PVdF-HFP | 10 wt. % Zn(OTf)$_2$ | 50:50 [OMIM]NTf$_2$: [OMIM]Br + 20 wt. % PVdF-HFP | 4.7 wt. % LiBr | — |
| 5 | 50:50 [OMIM]NTf$_2$: [OMIM]Br + 10 wt. % PVdF-HFP | 5 wt. % Zn(OTf)$_2$ + 2.35 wt. % LiBr | 50:50 [OMIM]NTf$_2$: [OMIM]Br + 10 wt. % PVdF-HFP | 2.35 wt. % LiBr + 5 wt. % Zn(OTf)$_2$ | — |
| 6 | 50:50 [OMIM]NTf$_2$: [OMIM]Br + 10 wt. % PVdF-HFP | 5 wt. % Zn(OTf)$_2$ + 2.35 wt. % LiBr | 50:50 [OMIM]NTf$_2$: [OMIM]Br + 10 wt. % PVdF-HFP | 2.35 wt. % LiBr + 5 wt. % Zn(OTf)$_2$ | 1.9 wt. % Br$_2$ in both gels |

Thus, it can be seen from Table 2 that:
Cell 1 contains no additional Br$^-$ species in the bromide electrode ionogel
Cell 2 contains Br$^-$ in the bromide electrode ionogel
Cell 3 contains Br$^-$ and Br$_2$ in the bromide electrode ionogel
Cell 4 contains additional PVdF-HFP in both ionogels (20 wt. % compared to 10 wt. %).
Cell 5 contains the same gels on both electrodes (with Zn and Br additives in both gels)
Cell 6 contains the same gel on both electrodes plus 1.9 wt. % Br$_2$ in both gels (this is identical to the classical flow battery composition).

TABLE 3

Electrochemical testing of Cells 1-6 from Table 2.

| Cell | CV Peak Potential (mA) | | Q @ 20 min Charge (mA · s$^{-1}$) | | Q @ 20 min Discharge (mA · s$^{-1}$) | |
|---|---|---|---|---|---|---|
| | Pre-charge | Post-charge | Cycle 1 | Cycle 2 | Cycle 1 | Cycle 2 |
| 1 | 15.6 @ 3.5 V | 5.43 @ 2.36 V | 3866 | 3657 (95%) | −2316 (60%) | −1732 (47%) |

TABLE 3-continued

Electrochemical testing of Cells 1-6 from Table 2.

| Cell | CV Peak Potential (mA) | | Q @ 20 min Charge (mA · s$^{-1}$) | | Q @ 20 min Discharge (mA · s$^{-1}$) | |
|---|---|---|---|---|---|---|
| | Pre-charge | Post-charge | Cycle 1 | Cycle 2 | Cycle 1 | Cycle 2 |
| 2 | 31.7 @ 3.2 V | 9.42 @ 2.87 V | 6993 | 8590 (122%) | −4084 (58%) | −4666 (54%) |
| 3 | 19.6 @ 3.4 V | 7.82 @ 3.3 V | 9234 | 7763 (84%) | −5823 (63%) | −3725 (48%) |
| 4 | 8.36 @ 3.5 V | 6.52 @ 3.3 V | 3024 | 3175 (105%) | −1606 (53%) | −1735 (55%) |
| 5 | 5.25 @ 3.3 V | 3.52 @ 3.5 V | 1173 | 1157 (99%) | −6.65 (0.6%) | −2.28 (0.2%) |
| 6 | 16.36 @ 3.2 V | 5.79 @ 3.3 V | 5489 | 3643 (66%) | −22 (0.4%) | −26 (0.7%) |

Figure 22:
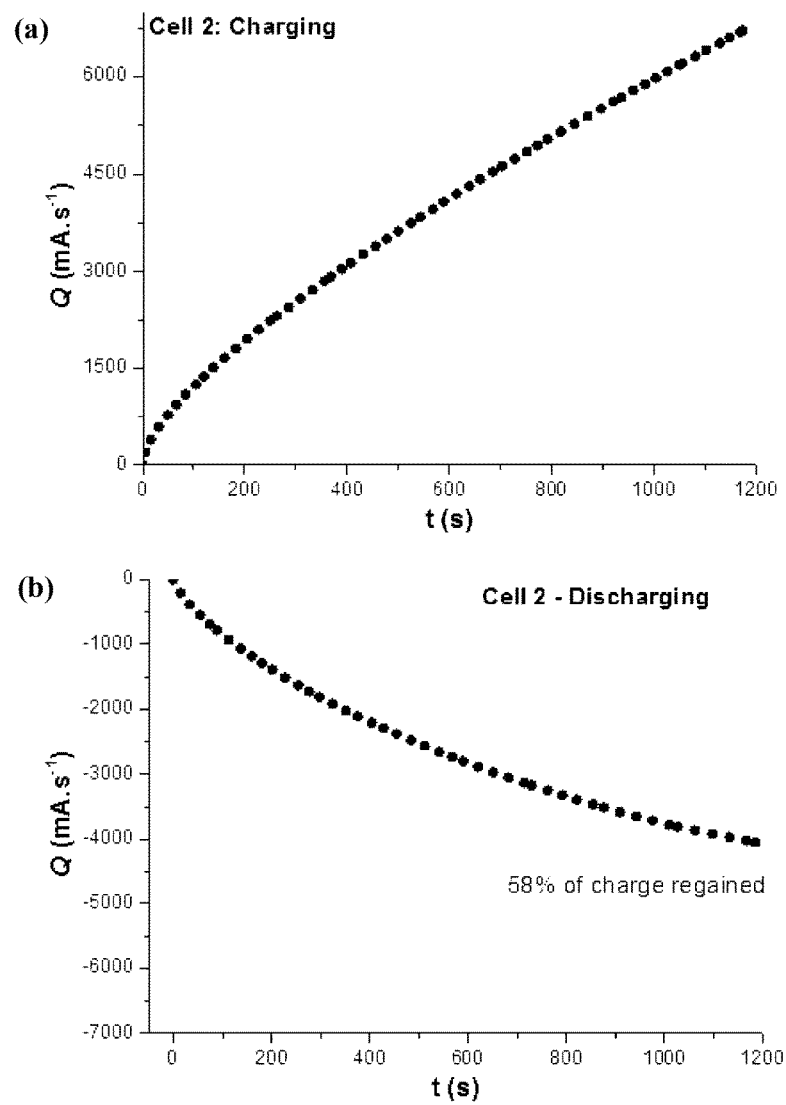
FIG. 22 shows charge/time plots for Cell 2 in Table 2 after a 20 minute charge (top) and 20 minute discharge (bottom), demonstrating that 58% of the total battery charge is regained upon discharge.

From Table 3, it can be seen that Cell 2 is the best performing of the batteries. This cell is able to achieve an increased charging on the second cycle (122% of the first 20 min charge cycle). In this set-up, the two discharge cycles achieved 58 and 54% discharge in 20 mins (see also FIG. 22).

In contrast, the batteries with the single gels (5 and 6) had less favourable discharge characteristics over the 20 min discharge period, achieving less than 1% in both cases for both cycles.

The invention claimed is:

1. An electrochemical cell comprising:
a first gelated ionic liquid film in contact with a first electrically conductive surface, wherein the first gelated ionic liquid film comprises a first ionic liquid encapsulated within a first gel matrix; and
a second gelated ionic liquid film in contact with a second electrically conductive surface, wherein the second gelated ionic liquid film comprises a second ionic liquid encapsulated within a second gel matrix;
wherein the first and second gelated ionic liquid films are in contact with each other, and
wherein the first gelated ionic liquid film further comprises a dissolved redox species, wherein the dissolved redox species is a halogen.

2. The electrochemical cell of claim 1, wherein either or both of:
(i) one or both of the first and second ionic liquid comprises one or more anions selected from the group consisting of a halogen, a sulfonylimide, a carboxylate, and a fluorinated phosphate anion; and
(ii) one or both of the first and second ionic liquid comprises one or more cations selected from the group consisting of an alkylpyridinium, a dialkylimidazolium, a dialkylpyrrolidinium, a tetraalkylphosphonium, and a tetraalkylammonium cation.

3. The electrochemical cell of claim 2, wherein the first and second electrically conductive surfaces are inert electrodes.

4. The electrochemical cell of claim 3, wherein each inert electrode independently comprises one or more of graphite, doped carbon nanotubes, non-doped carbon nanotubes, doped graphene, non-doped graphene, a graphene composite, carbon paper, platinum, gold, or titanium.

5. The electrochemical cell of claim 3, wherein the first electrically conductive surface is an anode, and the second electrically conductive surface is a cathode.

6. The electrochemical cell of claim 1, wherein the first and second gelated ionic liquid films are immiscible when in contact with each other.

7. The electrochemical cell of claim 1, wherein the first and/or second gelated ionic liquid film has a thickness of between about 50 μm and about 10 mm.

8. The electrochemical cell of claim 1, wherein the first and/or second encapsulated ionic liquid comprises at least one of:
(i) one or more anions selected from the group consisting of bromide, chloride, iodide, bis(trifluoromethyl-sulfonyl)imide, bis(fluorosulfonyl)imide, acetate, propionate, pentanoate, hexanoate, hexafluorophosphate, and tris(pentafluoro)trifluorophosphate; and
(ii) one or more cations selected from the group consisting of 1-butylpyridinium, 1-octylpyridinium, 1-(2-hydroxyethyl)pyridinium, 1-ethyl-3-methylimidazolium, 1-butyl-3-methylimidazolium, 1-pentyl-3-methylimidazolium, 1-hexyl-3-methylimidazolium, 1-(2-methoxyethyl)-3-methylimidazolium, 1-(1-methoxymethyl)-3-methylimidazolium, 1-methyl-3-octylimidazolium, 1-methyl-1-ethylpyrrolidinium, 1-methyl-1-butylpyrrolidinium, 1-methyl-1-hexylpyrrolidinium, 1-(2-methoxyethyl)-1-methylpyrrolidinium, 1-(1-methoxymethyl)-1-methylpyrrolidinium, tetrabutylphosphonium, tributyloctylphosphonium, tributyl(2-methoxyethyl)phosphonium, tributyl-tert-butylphosphonium, tributyl(1-methoxymethyl)phosphonium, tetraethylammonium, tetrabutylammonium, tributyloctylammonium, tributyl(2-methoxyethyl)ammonium, tributyl(1-methoxymethyl)ammonium, and tributyl-tert-butylammonium.

9. The electrochemical cell of claim 1, wherein said first and second gel matrices are formed from a gelating agent selected from one or more of a hydroxy-substituted organic compound, a polysaccharide, a dipeptide, a protein, a polymer, a poly(vinylidene fluoride-co-hexafluoropropylene) polymer, carbon nanotubes, non-doped or doped graphene, functionalised silica nanospheres, and a silica sol-gel.

10. The electrochemical cell of claim 1, wherein the second gelated ionic liquid film further comprises a second dissolved redox species selected from the group consisting of:
(a) an acetate, nitrate, sulfate, or triflate salt of Li$^+$, Mg$^{2+}$, Zn$^{2+}$, Cu$^{+/2+}$, Fe$^{2+/3+}$, Co$^{2+/3+}$, Mn$^{2+}$, or Cr$^{3+}$;
(b) an oxygen, permanganate, dichromate, perchlorate, or halide salt of Li$^+$, K$^+$, Ca$^{2+}$, Na$^+$, or Mg$^{2+}$; and
(d) a mixture of (a) and (b).

11. The electrochemical cell of claim 1, wherein one or more of:
- either or both of the first and second gelated ionic liquid film comprises two or more different ionic liquids;
- (ii) either or both of the first and second gelated ionic liquid film comprises two or more cations and two or more anions that together form a eutectic mixture; and
- (iii) either or both of the first and second gelated ionic liquid film further comprises an electrolyte salt.

12. The electrochemical cell of claim 1, wherein either or both of the first and second gelated ionic liquid film further comprises an electrolyte salt.

13. The electrochemical cell of claim 12, wherein the electrolyte salt is soluble in at least one of the first ionic liquid and the second ionic liquid.

14. The electrochemical cell of claim 1, which further comprises:
- a third gelated ionic liquid film in contact with a third electrically conductive surface, wherein the third gelated ionic liquid film comprises a third ionic liquid encapsulated within a third gel matrix; and
- wherein the second and third gelated ionic liquid films are at least partially in contact with each other.

15. The electrochemical cell of claim 14, wherein at least one of:
- the second and third gelated ionic liquid films are immiscible with each other; and
- the first and third electrically conductive surfaces are anodes and the second electrically conductive surface is a cathode.

16. A method of producing the electrochemical cell of claim 1, comprising:
- providing a first gelated ionic liquid film comprising a first encapsulated ionic liquid in contact with a first electrically conductive surface;
- providing a second gelated ionic liquid film comprising a second encapsulated ionic liquid in contact with a second electrically conductive surface; and
- contacting the first and second gelated ionic liquid films with each other.

17. The method of claim 16, wherein at least one of said steps of providing comprises:
- combining a gelating agent with an ionic liquid at a suitable temperature to produce a mixture, and allowing the gelating agent to set and thereby form a gelated ionic liquid film in which the ionic liquid is encapsulated; and
- contacting the mixture or the gelated ionic liquid film with an electrically conductive surface.

18. The method of claim 17, wherein
the mixture is contacted with the electrically conductive surface prior to allowing the gelating agent to set.

19. The method of claim 16 further comprising:
- providing a third gelated ionic liquid film comprising a third encapsulated ionic liquid in contact with a third electrically conductive surface; and
- contacting the second and third gelated ionic liquid films.

* * * * *

UNITED STATES PATENT AND TRADEMARK OFFICE
CERTIFICATE OF CORRECTION

PATENT NO. : 10,122,049 B2
APPLICATION NO. : 15/116802
DATED : November 6, 2018
INVENTOR(S) : Thomas Maschmeyer et al.

Page 1 of 1

It is certified that error appears in the above-identified patent and that said Letters Patent is hereby corrected as shown below:

In the Claims

Column 41, Claim 11, Line 3:
"either or both" should read --(i) either or both--

Signed and Sealed this
Tenth Day of December, 2019

Andrei Iancu
*Director of the United States Patent and Trademark Office*